United States Patent
Ritter et al.

(10) Patent No.: US 9,778,966 B2
(45) Date of Patent: *Oct. 3, 2017

(54) CLASSIFICATION AND MODELLING OF EXCEPTION TYPES FOR INTEGRATION MIDDLEWARE SYSTEMS

(71) Applicant: SAP SE, Walldorf (DE)

(72) Inventors: Daniel Ritter, Heidelberg (DE); Jan Sosulski, Freinsheim (DE)

(73) Assignee: SAP SE, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/185,397

(22) Filed: Jun. 17, 2016

(65) Prior Publication Data
US 2016/0292024 A1 Oct. 6, 2016

Related U.S. Application Data

(63) Continuation of application No. 14/458,824, filed on Aug. 13, 2014, now Pat. No. 9,406,040.

(51) Int. Cl.
*G06F 9/54* (2006.01)
*G06Q 10/06* (2012.01)
*G06Q 10/10* (2012.01)

(52) U.S. Cl.
CPC .......... *G06F 9/546* (2013.01); *G06Q 10/067* (2013.01); *G06Q 10/06316* (2013.01); *G06Q 10/10* (2013.01)

(58) Field of Classification Search
CPC ..................................... G06F 9/546
See application file for complete search history.

(56) References Cited

U.S. PATENT DOCUMENTS

| | | |
|---|---|---|
| 6,738,975 B1 | 5/2004 | Yee et al. |
| 7,086,066 B2 | 8/2006 | Kappel et al. |
| 7,289,964 B1 | 10/2007 | Bowman-Amuah |
| 7,788,319 B2 | 8/2010 | Schmidt et al. |
| 7,860,768 B2 | 12/2010 | Herter et al. |
| 8,046,722 B2 | 10/2011 | Kotani et al. |
| 8,046,772 B2 | 10/2011 | Upton |
| 8,176,157 B2 | 5/2012 | Abzarian et al. |
| 8,543,653 B2 | 9/2013 | Bhatt et al. |
| 8,572,633 B2 | 10/2013 | Barros |

(Continued)

OTHER PUBLICATIONS

U.S. Appl. No. 13/908,620, filed Jun. 3, 2013, Ritter et al.

(Continued)

*Primary Examiner* — Andy Ho
*Assistant Examiner* — Abdou Seye
(74) *Attorney, Agent, or Firm* — Fish & Richardson P.C.

(57) ABSTRACT

The present disclosure describes methods, systems, and computer program products for modeling exception flows in an integration system. One computer-implemented method includes identifying, by operation of an application integration system, an exception corresponding to an integration operation of an integration process, determining, by operation of the application integration system, a type of the exception, determining, by operation of the application integration system, one or more exception handling patterns for the type of the exception, and configuring, by operation of the application integration system, an exception flow of the integration process based on the one or more exception handling patterns.

17 Claims, 13 Drawing Sheets

(56) References Cited

U.S. PATENT DOCUMENTS

| | | | |
|---|---|---|---|
| 8,655,989 | B2 | 2/2014 | Ritter et al. |
| 8,661,107 | B2 | 2/2014 | Hoffmann et al. |
| 8,694,397 | B2 | 4/2014 | Seubert et al. |
| 8,701,080 | B2 | 4/2014 | Tripathi |
| 8,739,124 | B2 | 5/2014 | Ritter et al. |
| 9,104,201 | B1* | 8/2015 | Pillai .................... B64C 39/024 |
| 2003/0079200 | A1* | 4/2003 | Leymann ............... G06Q 10/10 717/104 |
| 2006/0159077 | A1 | 7/2006 | Vanecek, Jr. |
| 2009/0020924 | A1* | 1/2009 | Lin ....................... B82Y 30/00 264/605 |
| 2009/0288101 | A1* | 11/2009 | Gandin ................. G06F 9/4812 719/314 |
| 2012/0089534 | A1 | 4/2012 | Liebig et al. |
| 2013/0151463 | A1 | 6/2013 | Ritter et al. |
| 2015/0286947 | A1* | 10/2015 | Kummer ........... G06F 17/30958 706/48 |

OTHER PUBLICATIONS

U.S. Appl. No. 13/916,889, filed Jun. 13, 2013, Mathis, et al.
U.S. Appl. No. 13/916,911, filed Jun. 13, 2013, Ritter et al.
Shah, Hina et al. "Visualization of Exception Handling Constructs to Support Program Understanding" 10 pages; (http://pleuma.cc.gatech.edu/aristotle/pdffiles/shah_goerg_harrold_SoftVis08.pdf) [Aug. 7, 2014].
Weidlich, Matthias et al. "BPEL to BPMN: The Myth of a Straight-Forward Mapping" ; 2 pages ; (http://pleuma.cc.gatech.edu/aristotle/pdffiles/shah_goerg_harrold_SoftVis08.pdf) [Aug. 7, 2014].
Sosulski, Jan; Bachelor Thesis entitled "Exception Handling in Integration Systems based on the Busienss Process Model and Notion"; 84 pages; submitted timeframe: Feb. 10, 2014-May 5, 2014.
Ritter, Daniel et al. "Modeling Exception Flows in Integration Systems", 10 pages, Unpublished (expected publication date Sep. 1, 2014).

* cited by examiner

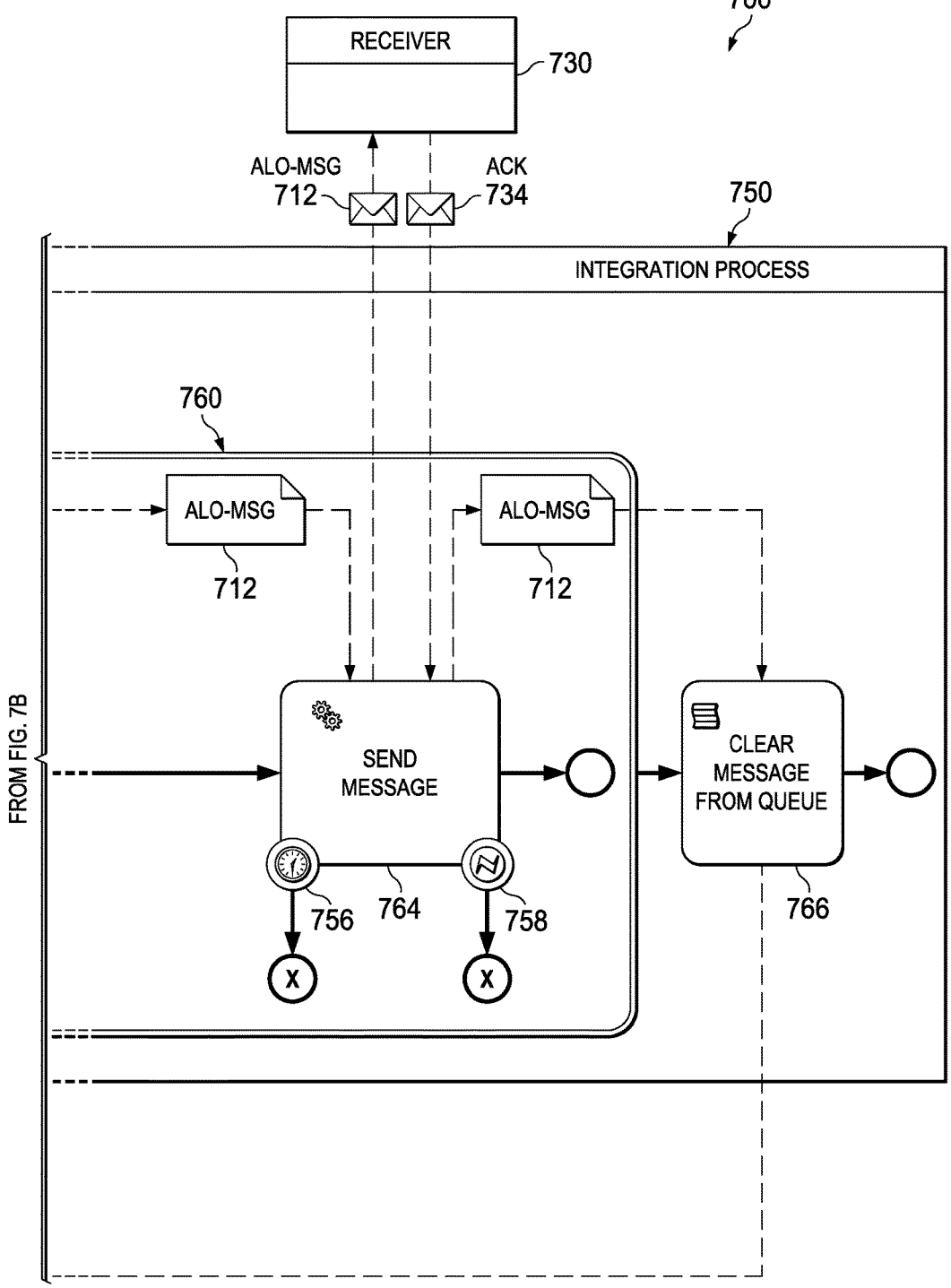

CLASSIFICATION AND MODELLING OF EXCEPTION TYPES FOR INTEGRATION MIDDLEWARE SYSTEMS

CLAIM OF PRIORITY

This application claims priority under 35 USC §120 to U.S. patent application Ser. No. 14/458,824, filed on Aug. 13, 2014, now U.S. Pat. No. 9,406,040, issued on Aug. 2, 2016; the entire contents of which are hereby incorporated by reference.

BACKGROUND

Enterprise application integration is a process of linking multiple business applications (e.g., supply chain management applications, enterprise resource planning (ERP) systems, customer relationship management (CRM) applications, business intelligence applications, payroll and human resources systems, etc.) together to simplify and automate business processes. Each application may reside on different operating systems and/or use different database solutions, computer languages, or data formats. Integration middleware systems can address the fundamental need for application integration by acting as the messaging hub between applications. These middleware systems mediate messages between the applications typically in formats like Extensible Markup Language (XML) and JAVASCRIPT Object Notation (JSON).

SUMMARY

The present disclosure relates to computer-implemented methods, computer-readable media, and computer systems for modeling exception flows in an integration system. One computer-implemented method includes identifying, by operation of an application integration system, an exception corresponding to an integration operation of an integration process, determining, by operation of the application integration system, a type of the exception, determining, by operation of the application integration system, one or more exception handling patterns for the type of the exception, and configuring, by operation of the application integration system, an exception flow of the integration process based on the one or more exception handling patterns.

Other implementations of this aspect include corresponding computer systems, apparatuses, and computer programs recorded on one or more computer storage devices, each configured to perform the actions of the methods. A system of one or more computers can be configured to perform particular operations or actions by virtue of having software, firmware, hardware, or a combination of software, firmware, or hardware installed on the system that in operation causes or causes the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination:

A first aspect, combinable with the general implementation, comprising classifying exceptions into a plurality of types.

A second aspect, combinable with any of the previous aspects, comprising providing a visualization of the exception flow.

A third aspect, combinable with any of the previous aspects, wherein the exception handling patterns are syntactically mapped to Business Process Model and Notation (BPMN) and its execution semantics.

A fourth aspect, combinable with any of the previous aspects, wherein the type of the exception comprises one or more of an activity failure, a message flow failure, a timeout, resource unavailability, an external event, or a constraint violation.

A fifth aspect, combinable with any of the previous aspects, wherein the one or more exception handling patterns comprise one or more of a retry pattern, a failover router, a compensation sphere, an exception sphere, a dead letter channel, or an invalid message channel.

A sixth aspect, combinable with any of the previous aspects, wherein the exception flow is configured to realize one or more of a quality of service (QoS), a message exchange pattern (MEP), or an enterprise integration pattern (EIP) integration logic.

The subject matter described in this specification can be implemented in particular implementations so as to realize one or more of the following advantages. The example techniques specify common exceptional situations in integration systems and exception types. The example techniques provide a modular, pattern-based approach for modeling exception flows in an integration system. A compliant representation in Business Process Model and Notation (BPMN) is defined. The mapping of the integration exception types to BPMN allows linking them to the integration flows and defines general integration exception handling strategies and patterns. The example techniques establish BPMN-based exception flows that include exception handling and compensation constructs and patterns to make the default exceptional behavior visible. The example techniques provide a basis for scenario-specific exception configuration. In general, the visibility of the exception handling mechanisms allow for better insights into the integration flow modeling, ease of use, and a more intuitive and faster modeling.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

FIGS. 7A-7C are a block diagram showing an example application of exception handling modeling for an At Least Once (ALO) processing.

Like reference numbers and designations in the various drawings indicate like elements.

DETAILED DESCRIPTION

Figure 1:
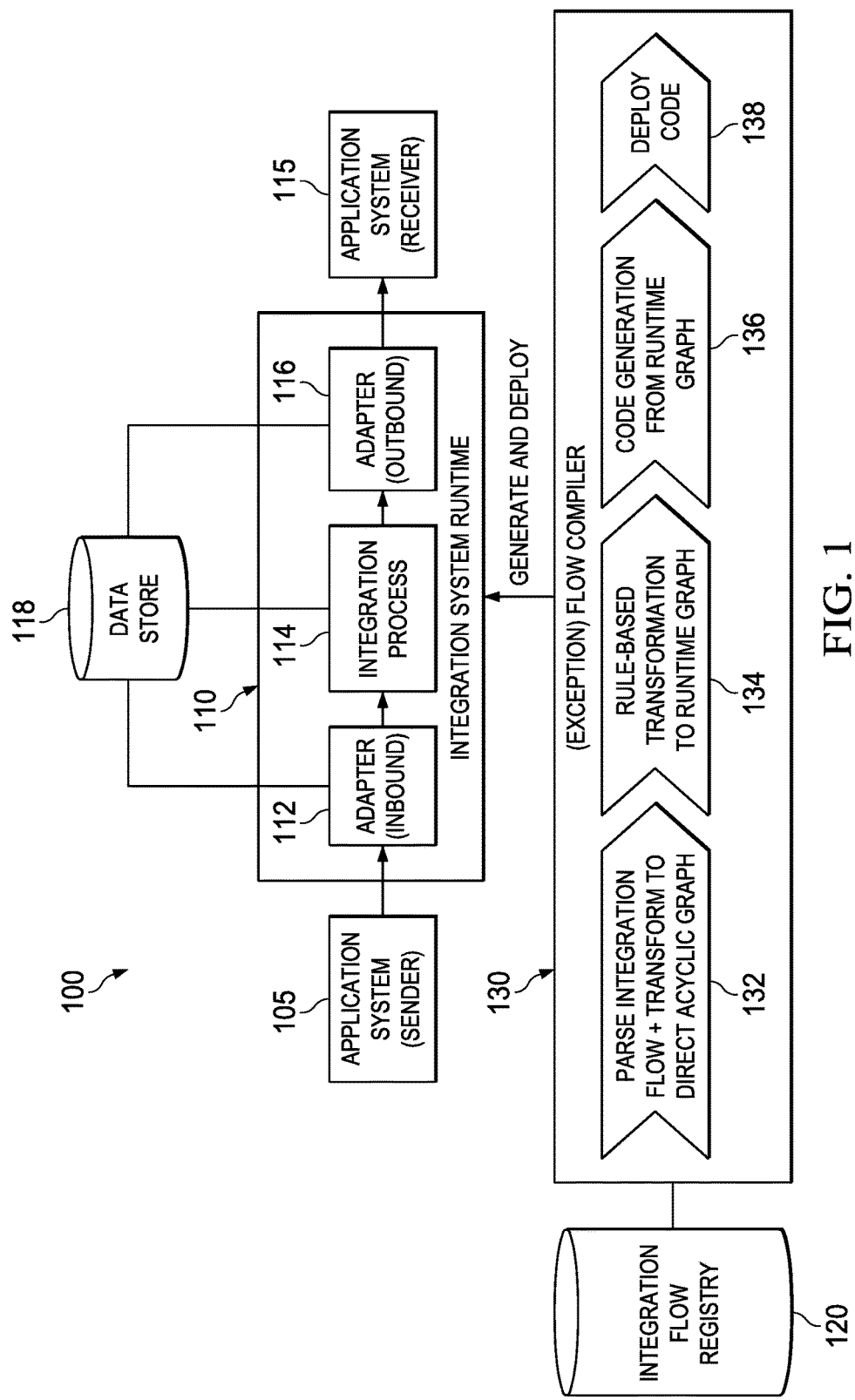
FIG. 1 is a block diagram illustrating an example computing system for handling exceptions in an integration system according to an implementation.

The following detailed description is presented to enable any person skilled in the art to make, use, and/or practice the disclosed subject matter, and is provided in the context of one or more particular implementations. Various modifications to the disclosed implementations will be readily apparent to those skilled in the art, and the general principles defined herein may be applied to other implementations and applications without departing from the scope of the disclosure. Thus, the present disclosure is not intended to be limited to the described and/or illustrated implementations, but is to be accorded the widest scope consistent with the principles and features disclosed herein.

Enterprise Integration Patterns (EIPs) are a collection of widely used patterns for integrating enterprise applications and business processes. These patterns represent a "de-facto" standard for integrating enterprise applications. EIP can be used as a general tool for integration modeling by providing means of designing integration processes that are not bound to a specific platform. A general-purpose model for integration systems can facilitate application and reuse of the integration systems for different implementations. In some instances, EIPs can be mapped and adapted to Business Process Model and Notation (BPMN) compatible syntax.

BPMN is a business process language that can be used to define control and data syntax and semantics, for example, for message processing in business integration processes. The EIP control and data flows can be expressed in the BPMN as a semantic model for message-based integration. An end-to-end flow of messages in an integration system can be referred to as an Integration Flow (IFlow). In general, an IFlow can be regarded as message-based integration from a sending application (e.g., a Sender, BPMN Participant) to one or many receiving applications (e.g., Receiver(s), BPMN Participant) via BPMN Message Flow configurations (denoting the inbound and outbound adapters) and dedicated participant(s) that specify an integration process (e.g., a composition of EIPs).

In some instances, in addition to data flow and control flow, it is desirable to have mechanisms of handling exceptional situations for the business integration system. Exception can include deviations from normal execution (i.e., those that conform to one of the expected execution paths) arising during the execution of an IFlow. The exceptions that occur in integration systems can, for instance, be caused by malformed messages or by temporary periods of high traffic in the system. Depending on the cause, exceptions can be resolved automatically by retrying to send the message, especially for exceptions caused by temporarily unavailable servers. Existing systems typically leave the default exception handling hidden in the various runtime implementations, and lack classification of exception types. This disclosure describes example techniques for handling exceptions in an integration system. A wide range of issues that may lead to exceptions during integration flow processing and the various ways to address them are investigated.

A systematic classification of IFlow exceptions and compensation handling are provided and subsequently are defined in the form of exception handling patterns and exception flow (e.g., the control flow in exceptional situations).

The patterns-based approach to exception classification provides a conceptual framework for classifying the exception and compensation handling capabilities of middleware systems, more generally, based on the Integration Flow modeling approach, while being independent of the specific runtime platforms. The example technique provides (1) a comprehensive classification of common exception types in integration systems, (2) an extension of the BPMN-based integration flow model to exception flows that make default handling and compensation visible to the user for all identified categories and allows configuration or change of the default behavior, for example, according to the user's requirements, (3) derivation of common exception handling patterns and their representation in BPMN, and (4) application to various integration middleware systems.

FIG. 1 is a block diagram illustrating an example computing system 100 for handling exceptions in an integration system according to an implementation. The illustrated computing system 100 includes or is communicably coupled with a first application system 105, an integration system runtime 110, a database or data store 118, a second application system 115, an integration flow registry 120, and a flow compiler 130. The example computing system 100 or its components can be implemented as a middleware system for application integration. In some instances, the components of FIG. 1 (e.g., the first application system 105, the integration system runtime 110, the second application system 115, etc.) can be implemented by one or more computers similar to that of the computer of FIG. 9. The computing system may be configured in another manner different from the example configuration of FIG. 1.

The first application system 105 can be a sending application that transmits a message to one or more receiving applications. The second application system 115 can be one of the receiving applications that receives the message. The first and second application systems can run on the same or different systems, using the same or different database solutions, computer languages, or data formats. For instance, example message formats can include Extensible Markup Language (XML), Simple Object Access Protocol (SOAP), Comma-Separated Values (CSV), JAVASCRIPT Object Notation (JSON), JAVA, C#, or any other format.

The integration system runtime 110 can, for example, be implemented as an integration middleware system. An integration middleware system can include a collection of software and hardware that provides technologies and services to enable integration of systems and applications and to enable interoperability between applications. The middleware system can supply services so the applications can exchange data in a standards-based way. In some implementations, the middleware system can include one or more protocol adapters or endpoints for receiving messages through different protocols (e.g., HTTP, TCP/UDP) and in different formats (e.g., SOAP, CSV), and a configurable pipeline or channel (also referred to as an integration process) that executes integration operations on the arriving messages. The integration system runtime 110 can include, for example, APACHE CAMEL, SAP HANA CLOUD INTEGRATION, SAP PROCESS INTEGRATION, or other systems.

In some implementations, the integration system runtime 110 can include multiple endpoints (or adaptors), components and processors (not shown). The components can provide a uniform endpoint interface and can act as connectors to all other systems. For example, the integration system runtime 110 can include a Java Message Service (JMS) component with a JMS application programming interface (API) connected to a JMS provider, an HTTP component with a servlet API connected with an HTTP client, a file component connected to a file system, or other components. The processors can be used to wire endpoints together and to perform integration operations.

In the example shown in FIG. 1, the integration system runtime 110 can include an inbound adapter 112, an integration process engine 114, and an outbound adapter 116. The inbound adapter 112 can be an endpoint for receiving messages through one or more particular protocols (e.g., HTTP, TCP/UDP) and handling messages in one or more formats (e.g., Simple SOAP, CSV). The integration process engine 114 can include an algorithmic software engine capable of performing, among other things, application integration (e.g., enterprise application integration) and any appropriate function consistent with this disclosure. The integration process engine 114 can execute integration operations, for example, by applying one or more EIPs as an integration pipeline or channel on the arriving messages from the inbound adapter 112. Example integration operations can include, for example, routing, transformation, mediation, interception, enrichment, validation, tracking, logging, or other operations. After applying integration operations, the integration process engine 114 can pass the processed messages to the outbound adapter 116. The outbound adapter 116 can be an endpoint to convert the processed message into a target format and language that is suitable for the receiving application 115.

The integration registry 120 can include multiple integration flows of one or more integration processes. An integration flow can include, for example, data flows and sequence flows (e.g., exception flows) of an integration process. A flow can include a sequence of operations (e.g., tasks, activities, or patterns). The integration flow can be represented in any suitable language or format. For instance, an integration flow can be represented in BPMN.

In some implementations, in order for the integration system runtime 110 to execute an integration process, one or more integration flows of the integration process need to be compiled by the flow compiler 130 to transform the integration flows in a source language into codes or instructions in a target language executable by the integration system runtime 110. The flow compiler 130 can include multiple modules 132, 134, 136 and 138, for example, for parsing input integration flow, transformation, code generation, and code deployment, respectively. The parser module 132 can perform lexical, syntactical, and semantic analysis to parse an integration flow and transform the flow into a direct acyclic graph. The transformation module 134 can transform the graph into a runtime graph according to a set of rules of the integration system runtime 110. Based on the runtime graph, a code can be generated by the code generation module 136, and the code can be deployed by the deployment module 138 for execution of the integration system runtime 110. The flow compiler 130 can include additional or different modules and perform fewer, more, or different operations for compiling the integration flow.

In some implementations, the various transport protocols or messages handled by the adapter 112 can be mapped to the BPMN Message Flow; the integration process or channels executed by the integration process engine 114 can be mapped to BPMN process or subprocess; and the integration operations (e.g., map, route, split, aggregate) can be mapped to BPMN Activity entities. In some instances, common exceptional situations of the message-based integration runtime 110 can be detected and handled; requirements (REQ) for treating these exception types can be derived and the requirements can subsequently mapped to BPMN as well.

Figure 2:
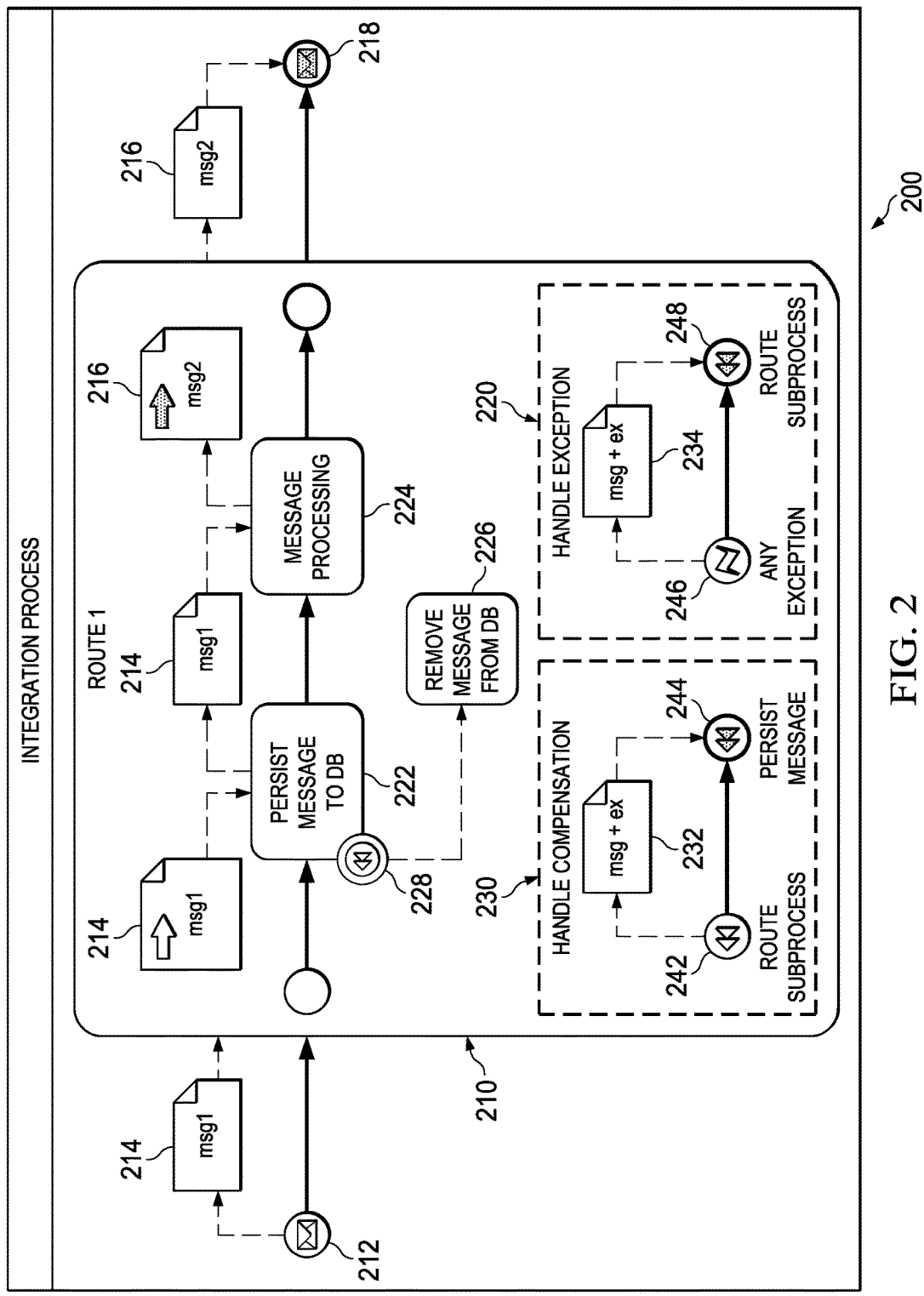
FIG. 2 is a block diagram showing example channel representation in Business Process Model and Notation (BPMN) according to an implementation.

Example main components of a BPMN process diagram include Activities, Sequence Flows, Gateways, and Events. Activities represent the tasks in a business process and can be either atomic or split into several subtasks. In this disclosure, "activity" and "task" are used interchangeably and each activity is represented by a rounded rectangle (e.g., tasks 222, 224, and 226) in the BPMN diagrams throughout FIGS. 2-7. Sequence Flows represent the connection between these Activities. The Sequence Flows are represented by solid arrows throughout FIGS. 2-7. In addition to the default Sequence Flow behavior, Events (e.g., represented by markers (e.g., marker 228) attached to the boundary of tasks) can be specified that create a new Sequence Flow with either parallel (non-interrupting Event) or sequential (interrupting Event) actions. A Gateway (e.g., gateway 344 in FIGS. 3 and 440 in FIG. 4) can be used to provide conditional or parallel Sequence Flows. In some implementations, in addition to the Sequence Flow, Data Flows (also referred to as Message Flows) can be defined. Data Flows can be used to model the exchange of Data Objects between different Tasks. For instance, in a buying process, a Task (or Activity) that fills out the purchase requisition has to pass this document to the responsible Task that is choosing potential vendors. By using Data Objects and Data Flow, this scenario can be realized in BPMN. In some instances, Data Flows or Message Flows can be represented by dashed arrows throughout FIGS. 2-7. Data Objects can include, for example, message, control information, exception information, or other data. The messages 214, 216, 232, and 234 in FIG. 2 are example Data Objects in a BPMN representation.

In some implementations, a BPMN diagram can include an Extensible Markup Language (XML) file that corresponds to the visual representation of the BPMN process. As an example, the flow compiler 130 may receive an exception flow in BPMN XML format and produce an internal representation with Java objects that are executable by the integration system runtime 110 such as APACHE CAMEL The transformation module 134 can create a corresponding graph representation from the BPMN representation for easier pattern detection. The code generation module 136 can rewrite the graph according to a predefined rule set into a representation that is more closely related to the APACHE CAMEL route representation. Finally, the code deployment module 138 can traverse the rewritten graph and can convert the graph to the resulting JAVA DSL string.

The modular compiling approach and the modular flow compiler have the ability and flexibility to change, switch or otherwise modify any of the modules as needed. For instance, the last module 138 could be changed into a module that translates the rewritten graph into the CAMEL SPRING DSL representation. In some instances, if additional pattern mappings are defined, only the third module 136 needs to be extended (e.g., by adding new translation rules). The complier can be applied, extended or adapted to source integration flows that are represented in a different modeling approach than BPMN. As long as a graph in the required structure is created, the graph to JAVA DSL converter can be reused.

In some implementations, integration exceptions can be classified, for example, based on features and handling strategies of the exceptions. Common integration exceptions can include recoverable errors (e.g., can be resolved using automatic message resending; represented by an exception, etc.) and/or irrecoverable errors (e.g., have to be handled manually, represented by a fault). The definitions of data and control flow, even during exception handling, can allow for modeling configurable exception channels (REQ-0: exception channels with data and control flow configuration). Several example exception types are described in the following.

Activity Failure: Activity failures can include failures during the execution of activities (e.g., integration operations). In some implementations, activity failures can be decomposed into task and subprocess failures (REQ-1: handling exceptions on activity level: subprocess, task). Subprocesses are a construct for composition of EIPs and thus allow re-usability of IFlow sub-sequences. Task failures during the execution of an IFlow are generally characterized by exceptional or illegal states of a task. For instance, if the execution of the split condition fails, the Splitter pattern is in an exceptional state, and when the expression does not find a match in the current message, the task gets into an illegal state. If the exceptional situation were removed, the message could be resent from a defined start point (REQ-2: retry activity), or the message can be mediated to a subsequent activity if the error could not be removed and the activity is optional (REQ-3: define alternative route on error). In terms of exceptional situations, the concepts of the task and other exception types can be derived.

Message Flow Failure: The message endpoint and protocol handling is commonly represented by adapters (e.g., adapters 112 and 116 in FIG. 1). Within the IFlow, the adapters can be represented by Message Flow configurations. In some instances, similar exceptional situations (e.g., timeouts, reception/transport failures) can apply to adapters and activities (REQ-4: handle adapter failures). In some instances, it may be difficult to distinguish between the message flow failure and activity failure. For instance, in the case of a structural mismatch between an incoming message and the mapping defined in a message translator, either the message or the mapping is incorrect. The message flow has to cope with fault messages received by peers, constraint violations (e.g., message size exceeds limit), and resource unavailability (e.g., peer unavailable). In most cases, the adapters can define the Message Exchange Pattern (MEP), e.g., a file adapter processes messages InOnly and the HTTP-protocol adapter requires InOut for synchronous messaging (REQ-5: handle constraints on message reception and sending and support MEPs). In the case of violations or errors within the adapter processing, Quality of Service (QoS) handling like At Least Once or Exactly Once has to be ensured, which may require the resending of the message from the Adapter (REQ-6: Messages shall be retried on adapter, instead of activity level).

Timeouts: Message Flow and Task processing can specify timeouts. These configurable "deadlines" can specify when the action needs to be completed. When setting timeouts during design time, the behavior of incomplete, timed-out actions can be configured (REQ-7: configure and handle timeouts).

Resource Unavailability and Handling: This is the case when a message flow or task requires access to one or more network or data resources (e.g., data objects, data store, external service) during its execution. If the data is not available, the task cannot proceed, resulting in an exception (REQ-8: deal with resource unavailability). For instance, for secure communication, the message flow might require certificates that have to be distributed to the correct key store at distribution time. Missing certificates will cause exceptional situations during runtime. Similar situations can occur for persistent patterns (e.g., claim check, aggregator) and patterns that rely on the availability of external services (e.g., external service, content enricher) when the resources are not available during runtime.

Tasks can have a persisted state in an in- or out-of-process data store (e.g., the database 118 in FIG. 1). In the case of errors during the task or subsequent task processing, compensation strategies can be configured for actions such as transaction rollback, purge message, etc. (REQ-9: similar to REQ-2; provide compensation for transactional retry processing or stateful patterns and QoS).

External Event: Events from sources external to the activity or channel are often used, for example, for ad-hoc re-configuration. Consequently, the activity or channel has to change its behavior or has to roll-back some of its previous actions (REQ-10: handle external configurations or exceptions). An example of external events that impact activities is the control bus pattern. In integration systems, the control bus is used to re-configure components in the IFlow or to inject test messages into particular components. Alternatively, the control bus can be used for purposes like uptime monitoring, exception handling, and statistics collection. External events share similarities to resource unavailability.

Constraint Violation: Constraints in the context of an IFlow can include invariants over elements in the control and data flow that have to be maintained to ensure the integrity and operational consistency of the IFlow (REQ-11: similar to REQ-5; configure constraint violations and react fault-tolerant). For example, size constraints can be applied to data and resources (e.g., a message) to prevent runtime or memory exceptions.

In some implementations, based on the different exception types, corresponding handling strategies can be defined and configured for respective exception types. Example exception handling techniques are described as follows.

Exception Handling on Activity Level

The BPMN activities (e.g., task, subprocess) can represent the basic integration operations within an integration flow, allowing for exception handling on BPMN task-level, i.e., the smallest unit of work in BPMN. BPMN subprocesses can include, among other things, different tasks. The BPMN sequence flow can denote the control flow during process execution. The corresponding data flow, representing the message exchange, can be modeled using BPMN messages and data objects. Handling exceptions includes both control and data flow during processing (cf. REQ-0).

In some implementations, handling exceptions on the task level is possible by using BPMN intermediate error events that are attached to the boundary of the task (cf. REQ-1). This error marker can act as a try-catch clause for named errors. The process continues from the BPMN sequence flow connected to the error marker. If a task performs critical operations, such as persisting data or locking resources, these actions need to be reverted when the whole process cannot finish normally. To achieve this, a BPMN compensation activity can be specified by attaching a compensation event marker to the boundary of a task. The same concepts can be applied to subprocesses. If an error event is thrown during the processing of a task in a subprocess and is not caught by an error event marker of that task, the error event marker of the parent subprocess can catch the error (e.g., by catch-all semantic). The other stated exception types can be modeled in BPMN by using different boundary event markers. For instance, timeouts (cf. REQ-7) correspond to the BPMN timer event, external events (cf. REQ-10) can be modeled as BPMN message events, and constraint violations (cf. REQ-5) can match the BPMN rule event (cf. FIG. 3).

Exception Handling on Message Flow Level

In some implementations, the BPMN message flow level can correspond to the adapters of an integration system. An adapter can perform various checks to verify the validity of a message and can reject messages if they exceed certain constraints (cf. REQ-5). In BPMN, there is no exception syntax that is applicable on the message flow level. The message is assumed to always arrive correctly. Due to this, it is not possible to project the properties of an adapter to the message flow in BPMN. In some instances, the properties can be projected by modeling the adapter explicitly as a separate process in a separate pool (cf. REQ-4). By doing so, it is possible to model the activities performed by the adapter explicitly (cf. REQ-11), which results in the mapping to BPMN process/subprocess elements.

Exception Handling on Message Channel Level

A message channel represents a certain sequence of processing activities and routing performed for predetermined endpoints. In integration systems, it is often desirable to be able to define an exception handling that triggers for exceptions that are not handled within the particular processors. Several example approached can be used to achieve this with BPMN (cf. REQ-0).

For example, the message channel can be represented by a BPMN pool/participant. In this case, errors that are not caught by boundary error event markers of the containing activities can be caught with a global event subprocess that is triggered on any kind of error events. However, with this approach, it is not easily possible to continue on a channel after an error has occurred. To be able to do this, all activities within the pool need to have the boundary error event attached. This can pose a redundancy in the modeling process and add unnecessary complexity to the diagram.

Another solution to the information propagation issue is to define nested channels as subprocesses of the parent channel. This allows for the use of the existing error and compensation event markers. However, as nested channels can be used standalone as well, each channel needs to be modeled as a subprocess and a pool.

In another approach, the channel can be modeled using a subprocess in a pool as a syntactic frame. FIG. 2 is a block diagram 200 showing example channel representation in BPMN according to an implementation. As shown in FIG. 2, the channel 210 is modeled as a syntactic frame. Channel-specific error or compensation handlers can be defined using event subprocesses with the respective start events. For instance, an exception handler 220 and a compensation handler 230 can be defined. The advantages of this modeling strategy include the reuse of the defined handler processes and the possibility to reference the channel in other channels by using a collapsed subprocess linked to the modeled channel.

Characterizing Exception Handling Strategies

BPMN follows certain basic strategies when handling exceptions. The basic module includes catching events. Typically, these are attached to the boundary of an activity to interrupt it and/or route the default sequence flow to an alternative flow. The attached events can include errors, timers, messages, and rules, the least three satisfying the worked-out requirements (REQ-7, REQ-10, REQ-11). Generic error events can be used to handle other exceptional situations such as resource unavailability (cf. REQ-8).

Aside from these markers, there can be compensation markers, which do not interrupt the activity but specify recovering actions in case the event is triggered. In some instances, these actions may only be executed in the case that the compensation event is triggered by explicit events or by BPMN-specific cases, such as the cancellation of transaction subprocesses. The compensation activities typically revert stateful changes made by the process in the case of unexpected termination (cf. REQ-9). For example, using an error event marker can interrupt the default sequence flow of an activity to perform remedying actions. A simple strategy is to connect the boundary event to an alternative sequence flow in the process (cf. REQ-3). A possible integration scenario for this is to specify alternative actions in case a resource is not available (cf. REQ-8).

Another similar strategy is a retry strategy. Here, the alternative route originating from the boundary event marker can connect to a gateway preceding the failed activity (cf. REQ-2), so that the process can go back to preceding activity for retrial. These exception handling patterns are comparable to the workflow exception handling patterns that classify exception handling patterns of workflow engines on three main characteristics. The first characteristic is whether the activity in which the exception occurred was marked as failed (SFF (force fail)), forced to be in a completed state by continuing the workflow case with the succeeding activity (SFC (force complete)) or restarted (SRS (restart)). The second characteristic distinguishes on the basis of the entire work-case. Here, the work-case can either be continued (CWC (continue workflow case)), meaning that other activities are not affected by the exception, or terminated (RCC (remove current case)). The last characteristic of distinction regards whether compensation is triggered (COM (compensate the effects in the exception flow)) or no compensation is executed (NIL (do nothing)).

Figure 3:
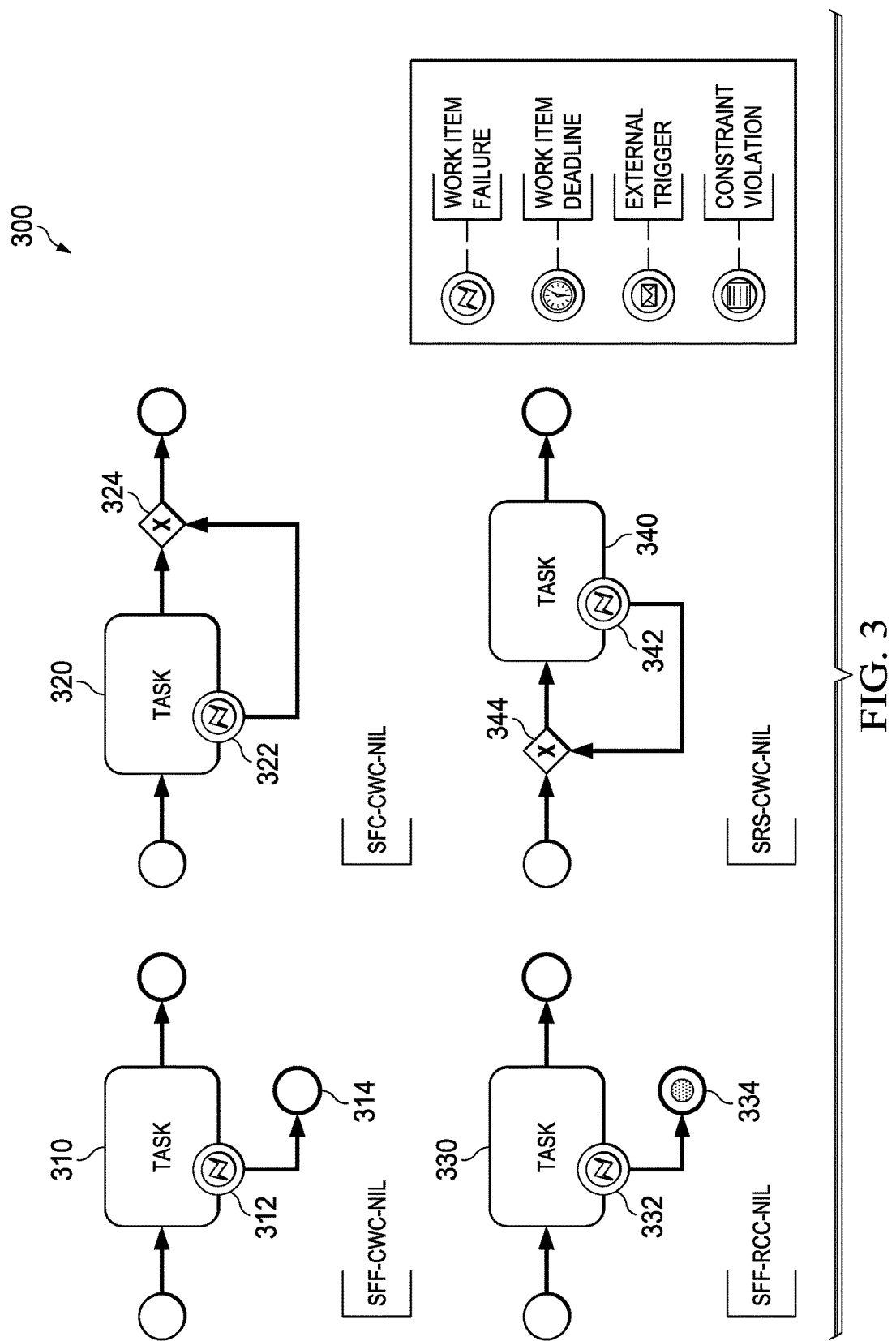
FIG. 3 is a block diagram showing example exception handling strategies according to an implementation.

FIG. 3 is a block diagram 300 showing example exception handling strategies according to an implementation. FIG. 3 shows four different combinations of the first two characteristics for the different work item categories in BPMN. The last property, whether to process compensating activities, is omitted for brevity as they would only add compensating activities to the sequence flow originating from the boundary events. As shown in FIG. 3, when a work item failure 312 occurs at task 310, the current task 310 stops, and the other work flow case can continue. In another example, when a work item failure 332 occurs at task 330, the current case can be removed and all tasks can be terminated at 334. In some other implementations, for example, when a work item failure 322 occurs at task 320, the work item may reenter the workflow at 324; or when a work item failure 342 occurs at task 340, the work item may go back to a preceding activity at 344 to retry the task 340.

For integration systems, these exception handling patterns may need additional properties to be applicable. The properties can include, but are not limited to, the specification of a retry limit, and whether a channel should continue its processing with the modified message in its state upon failure or with the message in its state at arrival at the adapter. A more detailed description will be given in the following with respect to example exception handling patterns in integration systems.

The retry pattern can be applied on activity level and on channel level in integration systems. When an exception occurs on the respective level, the system can attempt to process the message again. In some implementations, this reprocessing does not go on indefinitely but rather until the allowed number of retries is exhausted. The usage of this pattern is especially useful when handling resource unavailability in a network environment. A resource that is temporarily not available (e.g., due to high load) may be available on a subsequent attempt after waiting a certain amount of time. In some implementations, these processes might need compensation. For instance, a process that persists data and fails on subsequent actions can revert the changes, otherwise the system will not be in a consistent state. In BPMN, this can be modeled by using compensation markers to specify amending actions for each activity. The compensation can then be triggered by throwing a compensation event. Although with this approach it is necessary to model the data flow for all possible scenarios (e.g., exceptional and non-exceptional flows), this can lead to additional modeling effort and complex diagrams.

In some implementations, after all retry attempts are exhausted, three major strategies can be applied. First, continue the process on the subsequent step; second, end the process and propagate the exception back to the caller; and last, immediately terminate the process. The first strategy can be used in cases in which the failing process did not perform process-critical operations. In this case, the whole integration process can be continued as if there was no exception in preceding processes. However, the information about the exception is generally passed on. In some implementations, the first strategy can further be distinguished by differentiating between the usage of the original message or the processed message up until the point of failure. The second strategy can be used when the failing process did perform process-critical operations, meaning that subsequent message processing is not possible. Nevertheless, the end of the process is still considered graceful. The last strategy is similar to the second one, but it leads to termination of the entire integration process. In this case, the ending is considered abnormal and all processing will be terminated.

Towards a more general definition of exception handling, a syntactical approach can be used to follow from the BPMN-example and map all identified exception and compensation cases to the BPMN syntax. Each activity-based pattern can be annotated with BPMN Interrupting Event markers that allow fault handling in a separate flow. In addition, existing patterns such as Invalid Message Channel and Dead Letter Channel can be enhanced to be able to react on exceptional situations. In some implementations, these means can be used to automatically detect and analyze exceptional situations. In some implementations, the correction of defects can be done manually to bring the system in a consistent state. For instance, given a business exception that leads to an exception in the technical processing, the correction and restart might require manual tasks on the business/application level supported by the fault messages, (e.g., in Dead Letter Queues).

In some implementations, additional patterns can be introduced and fitted syntactically and semantically to solve the issue of lack of "global knowledge" for EIP-based integration that follows from the local (i.e., pattern-level) processing. For example, during processing, the connections to subsequent patterns are unknown in the current pattern. For fault-tolerant integration solutions, the knowledge about all patterns executed during messages processing is important for compensation (e.g., rollback changes made before the exception). Example fault-tolerant patterns including, for example, Failover Router, Compensation Sphere, Exception Sphere, Dead Letter Channel and Invalid Message Channel are described below.

The Failover Router can be used to react on non-callable EIPs within a sequence of EIPs by calling alternative channels in case of exceptions. In contrast to Detour pattern, the Failover Router checks whether a subsequent EIP can be called and takes counter-measures without requiring external configuration messages as in the Detour. The alternative channels can be modeled explicitly, and between the following pattern and the router an exception flow allows reacting on exceptions in the subsequent pattern. Fault messages can be sent to an alternative channel. Using the Join Router (i.e., combining two message channels into one), the different EIPs can be structurally combined again.

Figure 4:
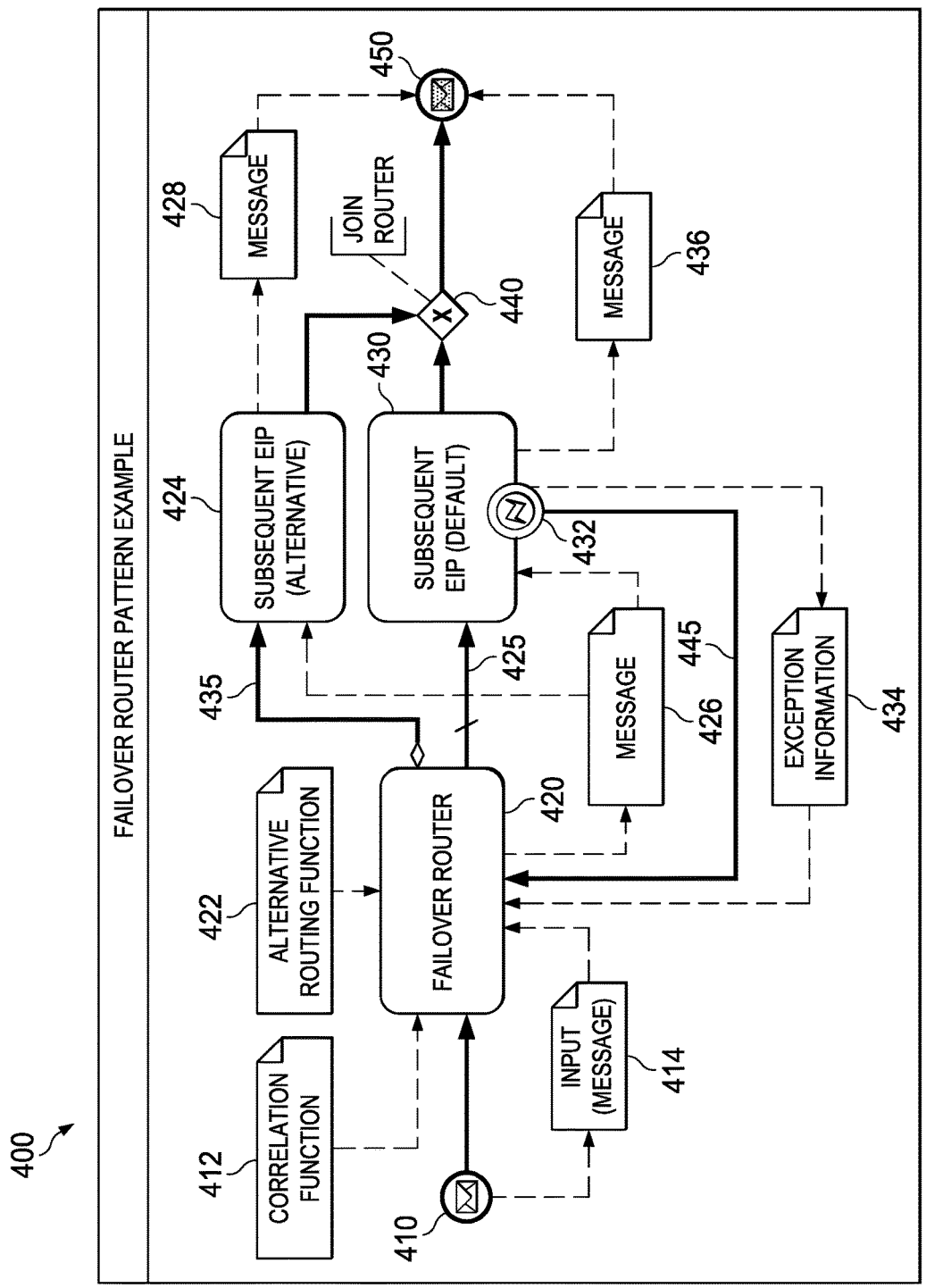
FIG. 4 is a block diagram illustrating an example Failover Router pattern according to an implementation.

FIG. 4 is a block diagram illustrating an example Failover Router pattern 400 according to an implementation. As illustrated, a sequence flow begins with a sending application 410 and destined to a receiving application 450. The Failover Router 420 is shown as an Activity with one default Sequence Flow 425 to the subsequent pattern 430 and one conditional sequence flow 435 to an alternative EIP 424. The routing can be determined based on the combination of an (alternative) routing function 422 and a correlation mechanism 412 from incoming messages 414 to used channels that are both provided by Data Objects. All messages (e.g., messages 414, 426, 428, and 436) can be represented as data objects. The exceptional processing from the original EIP 430 back to the router 420 via an exception flow 445 can be initiated using a Message Intermediate Event (throw) (interrupting error) 432. In some implementations, to combine the alternative channels and guarantee a 1:1 channel cardinality, the different channels can be structurally combined by a Join Router pattern 440 represented as a gateway in BPMN.

The Compensation Sphere can provide a global mechanism for exception handling beyond the capabilities of single or combined patterns. For the Compensation Sphere pattern, the integration runtime can handle correcting actions (i.e., compensations). For that, compensation activities can be registered (catch) explicitly or a general "catch-all" handler can be defined. To make this concept more modular, compensation spheres can overlap and be stacked hierarchically. Several handlers can be assigned. The activities in a compensation sphere can be logically linked through compensation characteristics. The compensation can either be defined for each activity in the sphere (case 1) or for the sphere as a whole (case 2).

When an activity belonging to a compensation sphere fails, the compensation can be executed. In case 1, the compensating activities can be executed in reverse order originating from the point of failure. In case 2, the compensating activities belonging to the whole sphere can be triggered. In BPMN, this concept can be realized by using the group element as "annotation." Activities belonging to the compensation sphere can be included in the group. The advantage of this approach is the ability to nest the compensation sphere and even intertwine them. However, the group element has no influence on the execution semantics, and it is not possible to attach a compensation event marker to the group boundary. Alternatively or additionally, compensation spheres can be realized by using the subprocess element. This element can have event markers attached and therefore can reflect the properties of the compensation sphere more adequately. Although the latter approach cannot intertwine compensation spheres as tasks and subprocess can only belong to one parent subprocess, in some instances, the latter approach can be preferred, as the semantics for compensations are clearly defined.

Figure 5:
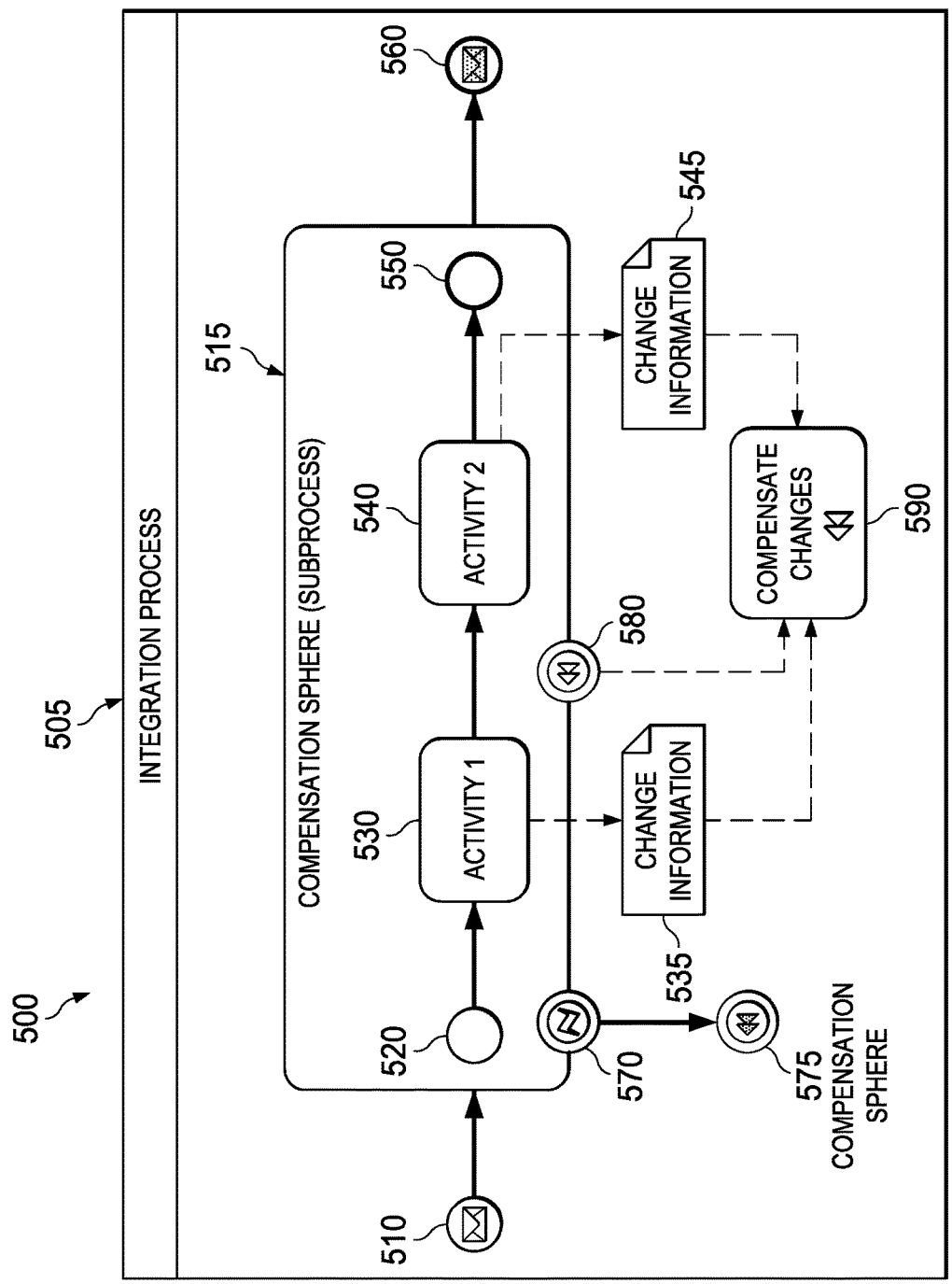
FIG. 5 is a block diagram showing an example Compensation Sphere pattern according to an implementation.

FIG. 5 is a block diagram showing an example Compensation Sphere pattern 500 according to an implementation.

The subprocess "Compensation Sphere (Subprocess)" 515 contains activities 530 and 540 that share compensation activities. For instance, this can be the case when both activities 530 and 540 perform changes to a database. The information about the changes (e.g., 535, 545) can be forwarded to the compensation activity (e.g., 590) and read when the activity is triggered. The compensation 590 can be initiated externally or internally. If any error event is thrown while processing the subprocess, the boundary error event marker 570 can catch it and start the corresponding compensation activities at 575. In some implementations, it may not be possible for the same activity to be contained in two subprocesses syntactically, which means that intertwining compensation spheres cannot be realized. However, it is possible to define compensation activities for particular activities in subprocesses, thus mimicking this behavior semantically. In some implementations, the described concept for Compensation Spheres can be applied for Exception Spheres in a similar manner.

The Dead Letter Channel is a pattern, which handles messages that cannot be processed by an integration system. Before moving a message to the Dead Letter Channel, the integration system can execute predefined remediation actions. For example, detouring the message to different processing steps or retrying the message a certain amount of times to make sure that a resource is not just temporarily unavailable. These erroneous messages cannot simply be deleted, as information would be lost. Thus, the messages can be moved to a dedicated Dead Letter Channel. In some implementations, all messages in this channel can be examined by an administrator to find the cause of the failure, to remedy the issue and to invoke a manual restart. An example of this can be seen in FIGS. 7A-7C. For example, in the integration process pool, a BPMN gateway 737 can manage the retry attempts in the case of processing failure. If the retries are exhausted, the message can be moved from the queue to the Dead Letter Channel. An administrator can review and handle the messages as depicted in the user task 720.

The Invalid Message Channel is similar to the Dead Letter Channel. However, the messages get passed through the integration system and arrive at their destination (e.g., the receiver). The receiver cannot process the message, for example, due to lexical errors in the message body. Instead of putting the erroneous message back on the channel and creating unnecessary load, the message is passed to an Invalid Message Channel that contains all failed messages. Similar to the messages in the Dead Letter Channel, these messages may need manual investigation as well.

Figure 6A:
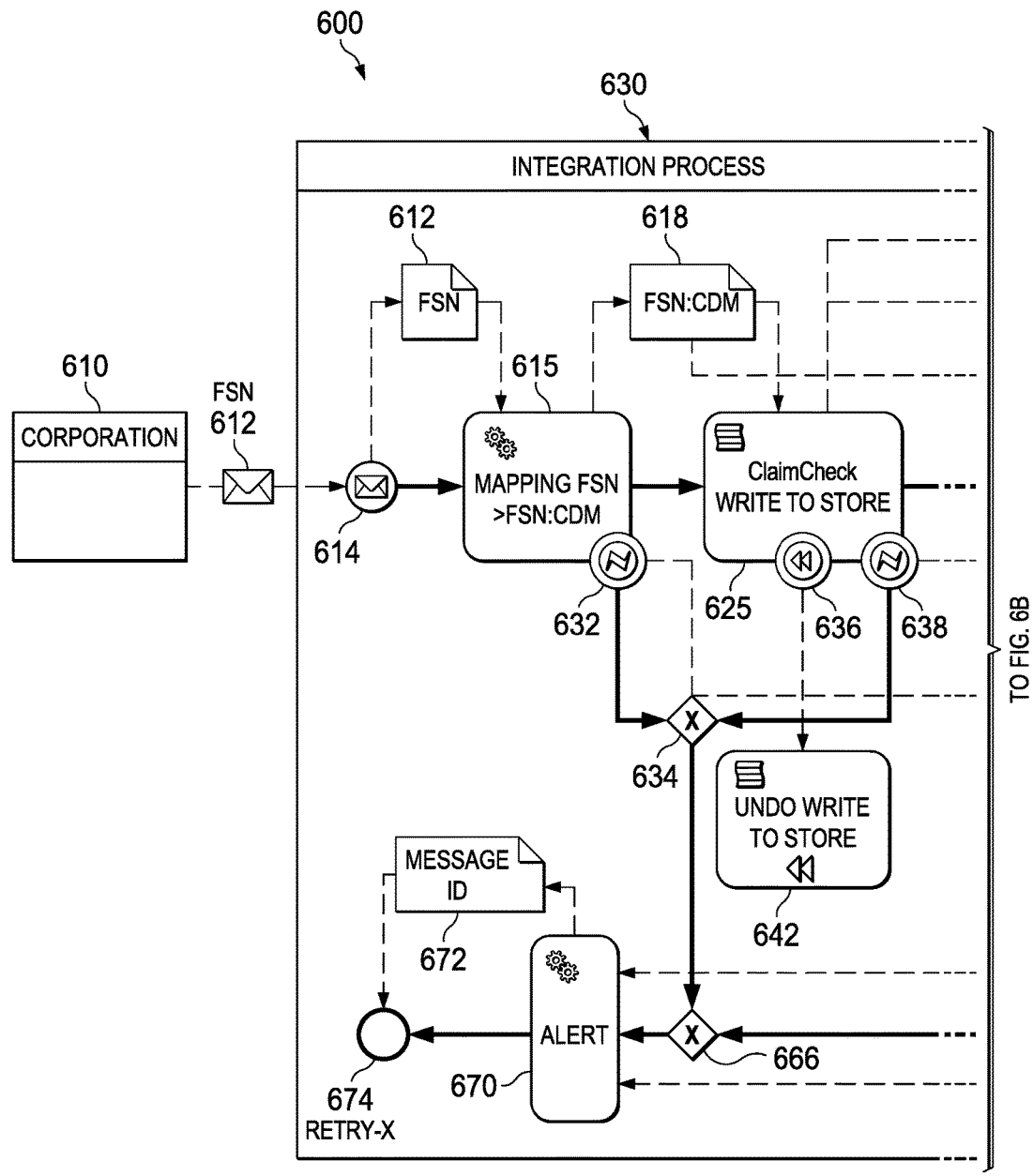
FIGS. 6A-6C are a block diagram showing an example application of exception handling modeling in an integration system according to an implementation.
Figure 6B:
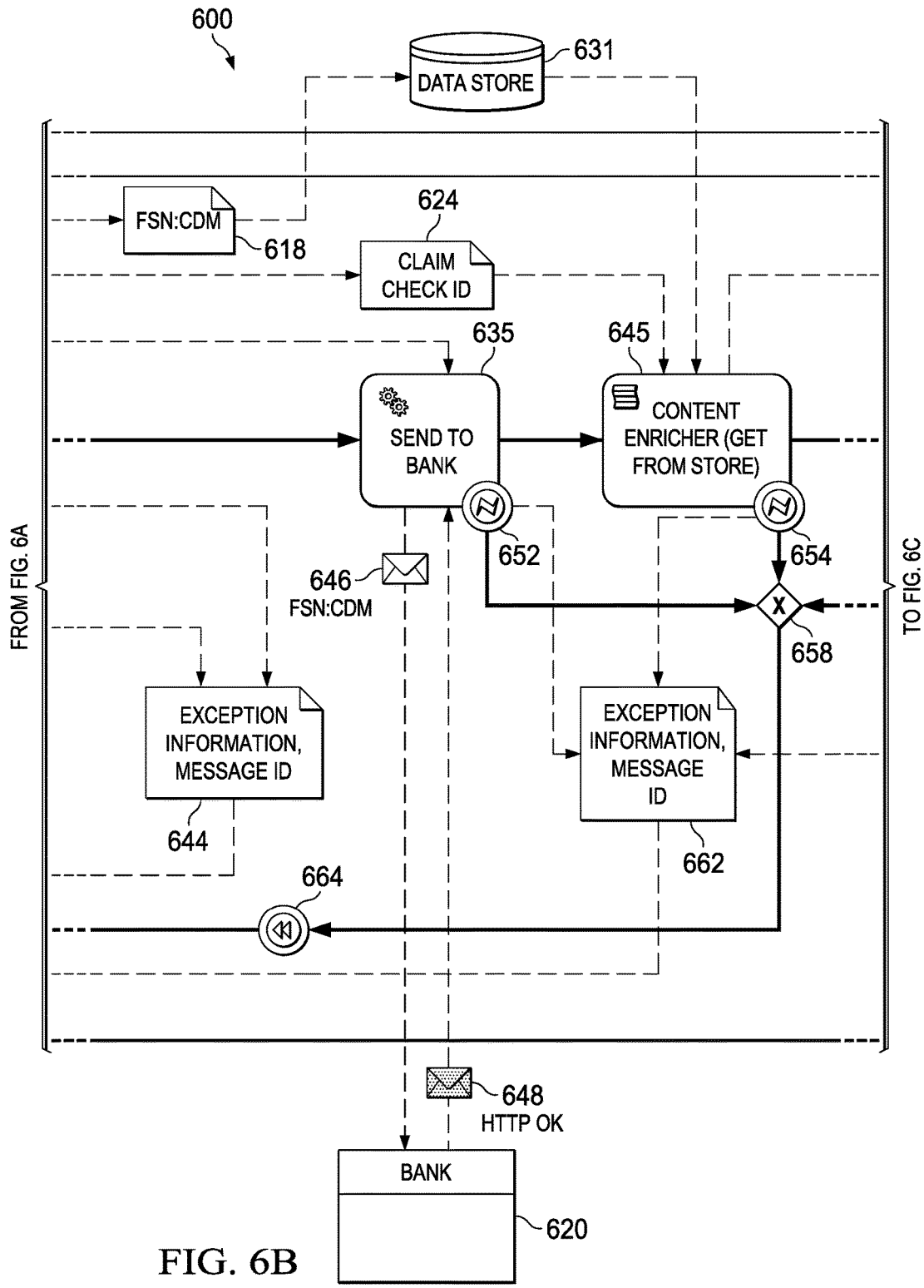
Figure 6C:
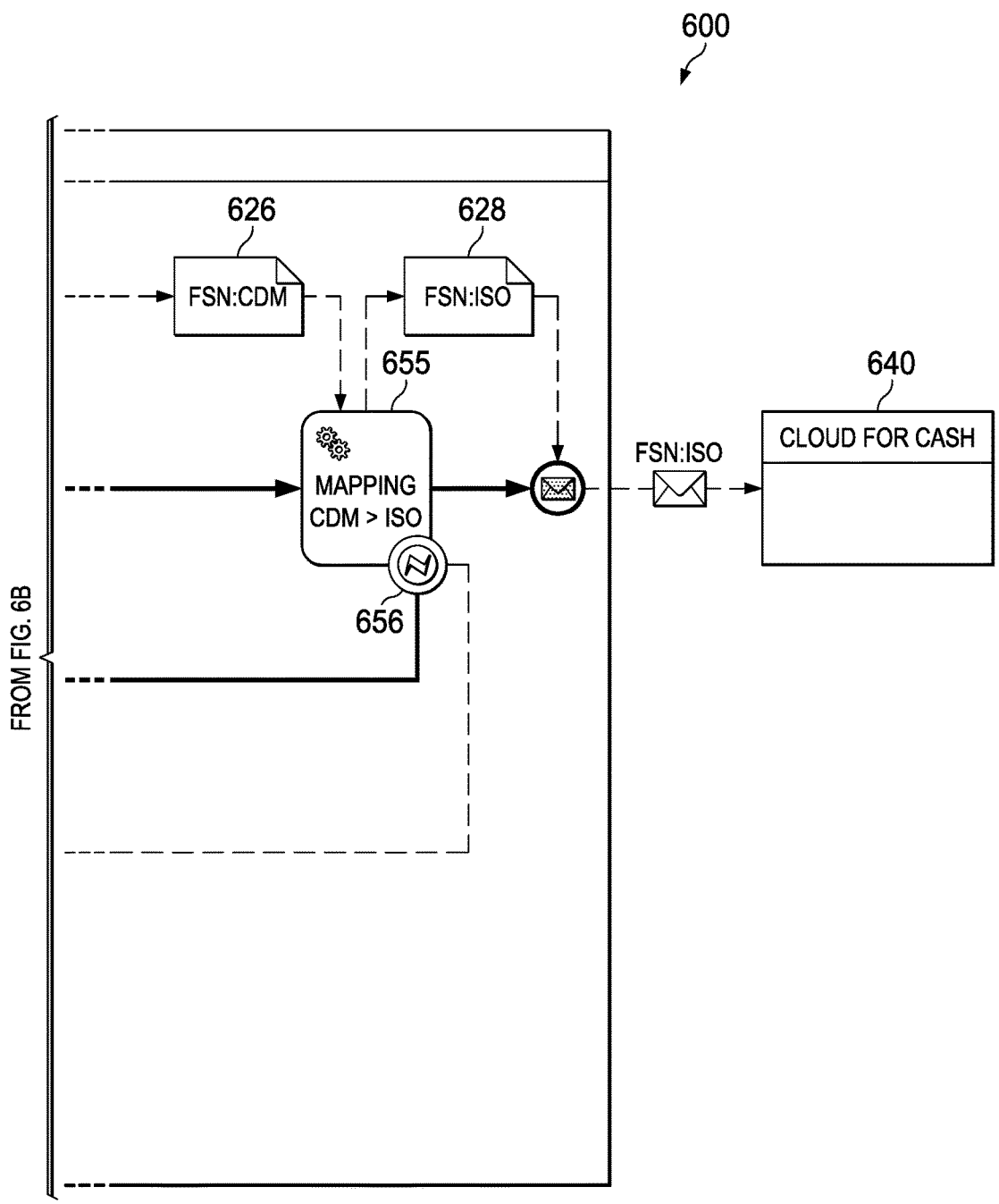

FIGS. 6A-6C are a block diagram 600 showing an example application of exception handling modeling in an integration system according to an implementation. Specifically, FIGS. 6A-6C show an asynchronous integration scenario of a corporation 610 with its bank 620 and business monitoring via SAP Cloud for Cash (C4C) 640, syntactically expressed in BPMN. The corporation 610 can include a sending application to transmit a message to the receiving application C4C 640 through an application integration system 630. For instance, the corporation 610 can send a message 612 (e.g., in Financial Services Network (FSN) type) to the application integration system 630. The application integration system 630 can include adapters (e.g., adapters 614 and 656) and a series of integration tasks/operations/patterns (e.g., Tasks 615, 625, 635, 645, 655, etc.). The incoming message 612 can be received by the adapter 614 and translated to a canonical data model (CDM) incarnation "FSN:CDM" 618 for further processing, for example, using a Message Translator Task 615. Through an adapted Claim Check Task 625, the message 618 can be stored for later use. In some instances, the message 618 can be handed over to an External Service Task (e.g., Send to Bank Task 635) to send the message 646 in the canonical data model to the bank 620 (no further translation required) to provide a consistent database for monitoring purposes. If the message was received, the bank 620 returns an HTTP OK 648 to confirm the correct processing of the message. In some implementations, the stored message can be read from the Data Store 631 with the help of the corresponding Claim Check ID 624, enriched by a Content Enricher Task 645, translated to a standardized ISO format "FSN-ISO" by a translator 655 and sent to the receiving C4C application 640, which tracks the message exchange from a business perspective.

The above order of operations belongs to an expected normal execution path. In some instances, exceptions can occur in one of the Tasks (e.g., Tasks 615, 625, 635, 645 and 655 in the integration flow). If an exception occurs, the user or viewer cannot determine the behavior of the system. In some instances, a precise definition of exception handling for this scenario is critical, as data is stored to a persistent storage. In order to leave the system in a consistent state, the system has to determine whether data was already persisted or not upon failure. If this was the case, the persisted data has to be deleted.

With the example BPMN-based exception handling techniques described herein, FIGS. 6A-6C show example exception flows that are represented by solid arrows originating from exception events or markers (e.g., events 632, 638, 652, 654, and 656) and/or compensation events or markers (e.g., compensation event 636 attached to the ClaimCheck Write to Store Task 625) are attached to the boundary of the Tasks. The integration operations/patterns (e.g., Tasks 615, 625, 635, 645 and 655) can be marked with an intermediate error event (e.g., according to the Activity Failure Pattern) for activity level handling. The default behavior can lead to an Exception Channel pattern (not Invalid Message or Dead Letter Channel), which can be part of a surrounding Message Retry pattern, that enables retries from the message endpoint (i.e., message flow). For example, the activity "Send to Bank" 635 in shows an Interrupting Event Subprocess (i.e., Error) 654 attached to the Service task (represented by a rounded rectangle with a gear) that represents the External Service pattern. The model (semantics) in this example defines the instantiation of a new channel with its own control and data flow allowing a scenario-based, context-aware fault message definition and processing on activity level.

In general, exception flows can include exception handling patterns or other operations that can be performed upon an exception. The user or viewer can comprehend the exception flow of the integration scenario without having to consider system-specific implementations or to investigate the source code for the integration process definition, and can understand how the default handling can be adapted to custom requirements. The exception flows show example syntax representations that are mapped to BPMN.

In the example shown in FIGS. 6A-6B, the exception flows can be divided into two main groups, connecting to two different Gateways 634 and 658. In some implementations, such a division can be based on whether compensation is necessary if any of the Tasks, succeeding the persisting Task, throw an error event. For example, the Gateway 658 can lead to a throw Compensation Event 664. This can trigger, for example, previously described compensation activities; therefore, the stateful changes can be reverted. The Gateway 634 may not throw a compensation event on its exception flow because no data was persisted. However, all exceptional flows can lead finally to the Alert Task 670, which can trigger the necessary failure notifications. Then, the process ends with the Retry-X End Event 674, indicating that the entire process can be retried, not only parts of the process.

In addition, the exceptional data flow can be included. In FIGS. 6A-6B, example exceptional data flow is depicted as dashed arrows originating from the error events and/or compensation events. The exceptional data flow can include exception data objects 644 and 662 (e.g., including exception information and message ID) that specify the error messages. For example, the exception data objects 644 and 662 can include the cause of the exception, an arbitrary message and state data from the scope of the respective task, or other information of the exceptions. The information about the exception can be passed to the Alert Task 670, which can therefore react to different exception types accordingly. For example, the Alert Task 670 can notify an administrator about the message retry on exception and/or represent configurable exception channel operations.

In some implementations, after the exception channel processing, the message can be re-sent from the incoming message flow (implicitly modeled). The Claim Check pattern 625 can be used to preserve the original message for processing. After the "Send to Bank" External Call pattern 635 sends the message to the bank 620, an exception may occur on the subsequent retry, if the original message is still in the data store 631. To guarantee transactional rollback in the case of failure, a compensation pattern can be used by attaching a compensation handler Undo Write To Store 642 and a compensation intermediate event 636 to the exception channel, which removes the message from the data store 631, before retry.

In messaging, Quality of Service (QoS) is a characteristic of network reliability. It describes which guarantees can be given for a particular message transfer. Different applications can have different QoS requirements. For instance, when sending an order to an online shop, the order should have a QoS level of either at most once or exactly once. If the message arrives more than once, a duplicate order would be registered, which is bad for the customer. If exactly once is used, the customer can be sure his order is received and not duplicated.

In some implementations, Quality of Service (QoS) support can be crucial for integration systems. When sending a message synchronously to a receiver, the QoS "Best-Effort" can be applied (i.e., delivery will be attempted, otherwise the sender will receive an exception message). In the case of asynchronous messaging, this may not be sufficient. The message has to be persistently stored to guarantee the delivery, e.g., in a message queue, since the sender cannot be notified.

Figure 7A:
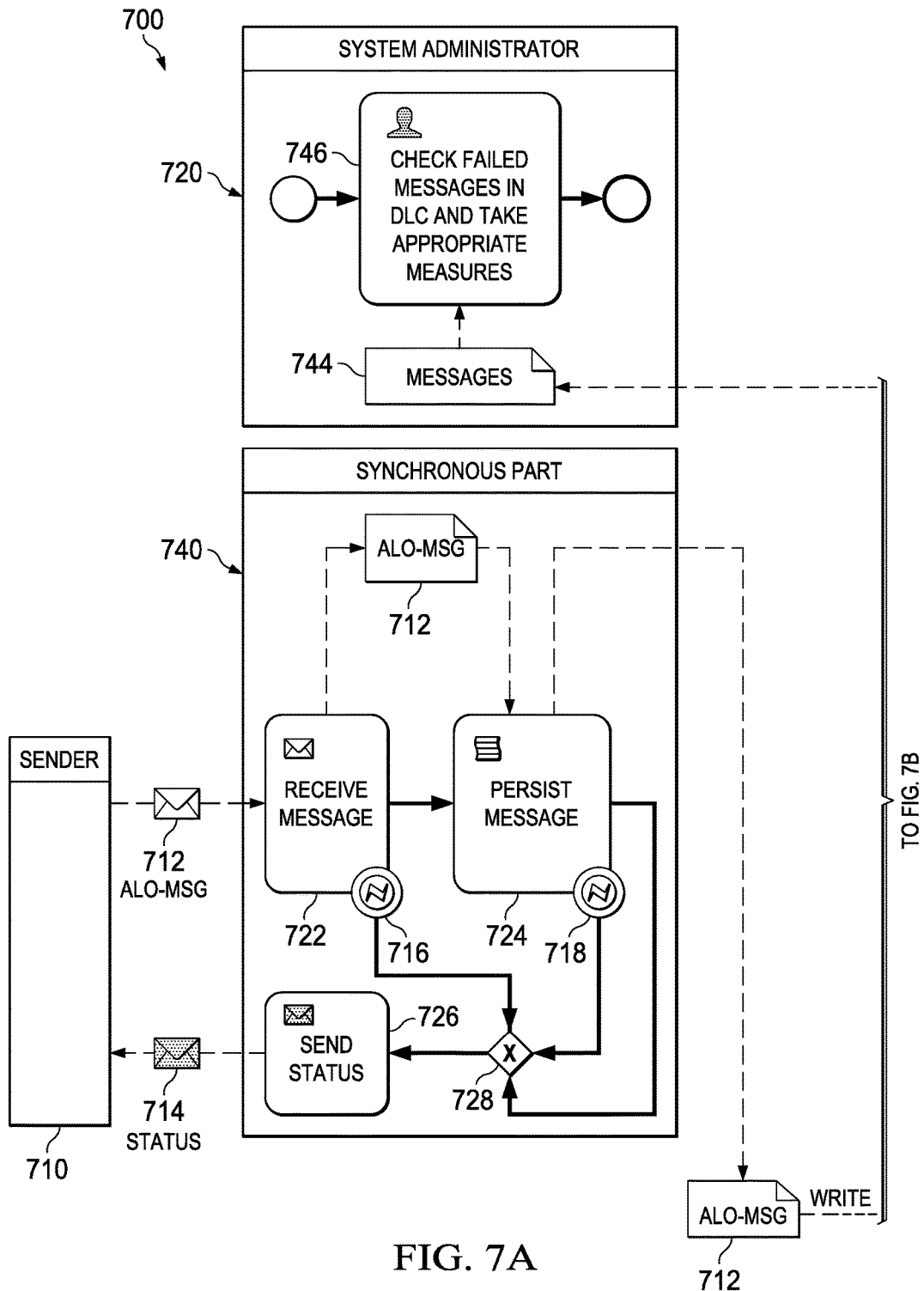
Figure 7B:
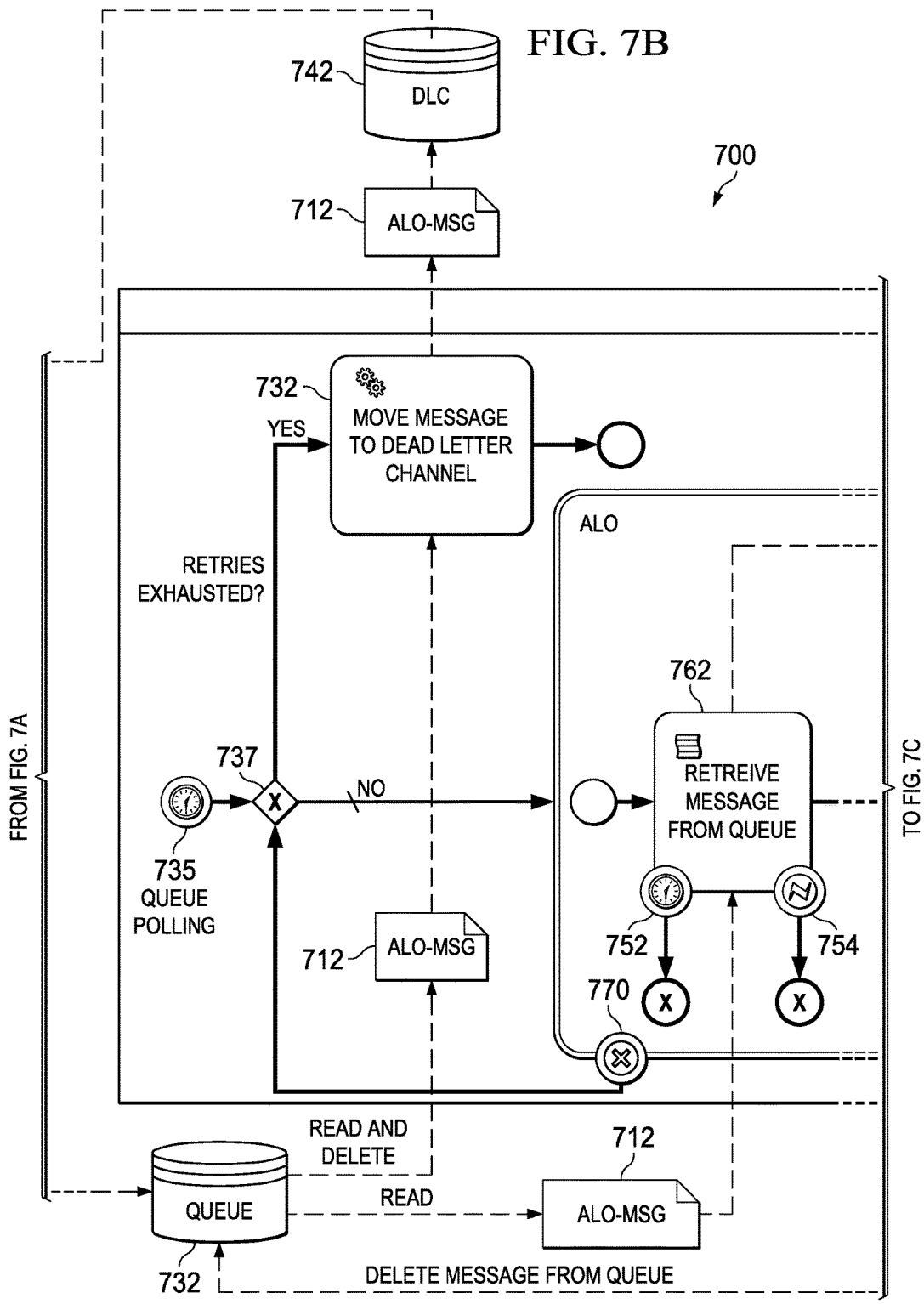

FIGS. 7A-7B are a block diagram 700 showing an example application of exception handling modeling for an At Least Once (ALO) processing. A sender 710 transmits a message to a receiver 730 with ALO QoS requirement. In order to guarantee ALO processing, incoming messages 712 have to be persisted. This can be done by using a synchronous endpoint 740 that tries to persist the message 712 and returns the status 714 to the sender 710. In the example shown in FIGS. 7A-7C, the integration process starts with a synchronous part 740 where the message system persists the message 712 to allow for the further reliable processing. After persisting, the system returns the status 714 about success or failure to the sender 710. After this interaction, the synchronous part 740 is finished.

The "Integration Process" 750 itself can be run in multiple instances. For example, it can start periodically by polling the message queue 732 to detect new messages 712. The transactional subprocess 760 can perform critical operations of retrieving the messages from the queue (e.g., by Task 762) and sending it to the receiver 730 (e.g., by Task 764). Additional or different activities or tasks that alter the message can take place in the subprocess 760 as well. If any of the activities time out (e.g., timeout event 752 or 756) or throw an exception (e.g., error event 754 or 758), the whole transaction can be canceled. A canceled transaction 770 can automatically trigger all compensation activities of the subprocess in reverse order, originating from the point of failure. However, in this example, none of the actions are stateful, and therefore no compensation activities are defined. In some other implementations, compensation activities can be included. After the cancellation is completed, the process 750 returns to the start at 735 and checks if the number of retries is exhausted. If that is the case, the message will be removed from the queue (e.g, by Task 732) and moved to the Dead Letter Channel. In some implementations, manual intervention or operations can be incorporated into the integration process. For example, an administrator can investigate these messages manually when the message is moved to the Dead Letter Channel. If the message would succeed, this would finish the transactional subprocess at 746 and task appropriate actions (e.g., trigger the deletion of the processed message from the queue). After that, the integration process 750 is finished. The depicted process ensures ALO processing, as messages will be retried whenever a process in the transaction fails. For example, if the acknowledging response 734 from the receiver 730 does not arrive, the "Send Message" task 764 times out and the system can send the message again.

Figure 8:
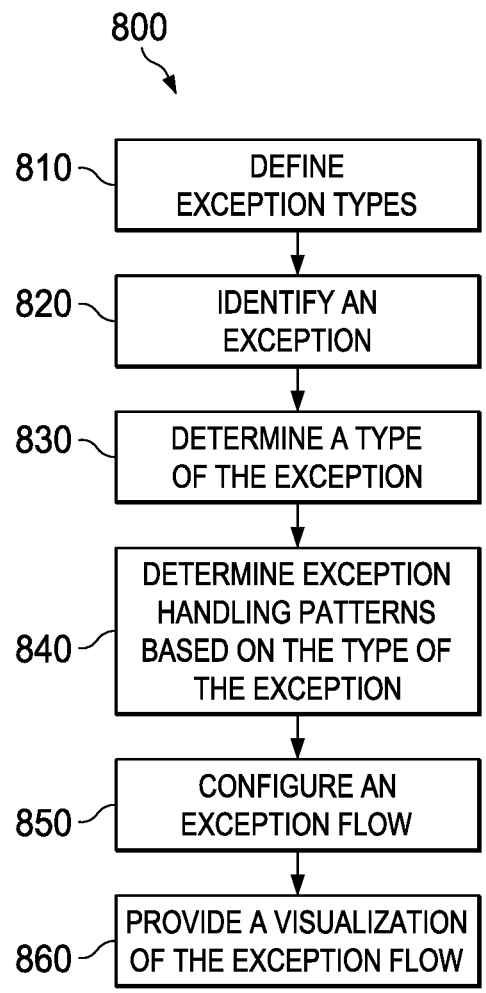
FIG. 8 is a flow chart illustrating a method for modeling exception flows in an integration system according to an implementation.

FIG. 8 is a flow chart 800 illustrating a method 800 for modeling exception flows in an integration system according to an implementation. The example method 800 can be performed, for example, by the example integration system as described with respect to FIG. 1 or another system. For example, the method 800 may be implemented by integration systems, such as SAP HANA CLOUD INTEGRATION, SAP PROCESS INTEGRATION, or the open-source system APACHE CAMEL. For clarity of presentation, the description that follows generally describes method 800 in the context of FIGS. 1-7. However, it will be understood that method 800 may be performed, for example, by any other suitable system, environment, software, and hardware, or a combination of systems, environments, software, and hardware as appropriate. In some implementations, various steps of method 800 can be run in parallel, in combination, in loops, and/or in any order.

At 810, one or more exception types can be classified or otherwise defined. Example exception types can include an activity failure, a message flow failure, a timeout, resource unavailability, an external event, and a constraint violation. Additional or different exception types can be defined. From 810, method 800 proceeds to 820.

At 820, an exception corresponding to an integration operation of an integration process can be identified. For example, the exception can be identified by operation of an application integration system (e.g., the example integration system 100 of FIG. 1). The exception can be identified, for example, when one or more errors and/or triggering events of an exception or compensation occur. From 820, method 800 proceeds to 830.

At 830, a type of the exception can be determined, for example, by operation of the application integration system. The type of the exception can be one or more of the types described at 810 or it can be other types. The application integration system can determine which exception type into which the identified exception falls. In some implementations, the identified exception may fall into more than one exception types defined at 810. From 830, method 800 proceeds to 840.

At 840, one or more exception handling patterns can be determined for the identified type of the exception, for example, by operation of the application integration system. In some implementations, the exceptions can be handled according to different levels (e.g., activity level, message flow level, message channel level, or other levels). The exception handling can include compensation. In some implementations, different exception handling patterns can be defined and serve as modular exception handling elements for reuse, composition, switch, and modification. Example exception handling patterns can include a retry pattern, a failover router, a compensation sphere, an exception sphere, a dead letter channel, or an invalid message channel. The exception handling patterns can be chosen based on the identified type of the exception. In some instances, more than one exception handling pattern can be applied to the identified exception. In some implementations, multiple exception handling patterns can be chained, swapped, combined, or otherwise managed to configure additional exception handling patterns. In some implementations, if an exception can be classified into multiple types, corresponding exception handling patterns of the multiple types can be applied to the exception. In some implementations, the exception handling patterns can be syntactically mapped to Business Process Model and Notation (BPMN) and its execution semantics, for example, by representing the exception handling patterns in BPMN format. Example exception handling patterns are described with respect to FIGS. 2-5. Additional or different exception handling patterns can be defined. From 840, method 800 proceeds to 850.

At 850, an exception flow of the integration process can be configured based on the one or more exception handling patterns, for example, by operation of the application integration system. The exception flow can include one or more exception handling patterns, for example, chained according to a particular order. In some implementations, beyond default exception handling approaches, the exception flow can be customized, tailored, designed, or otherwise configured based on, for example, a particular business integration application, customer requirement, etc. For instance, the exception flow can be configured to realize one or more of a quality of service (QoS), a message exchange pattern (MEP), an enterprise integration pattern (EIP), or other integration logics. As an example, the exception flow can be configured to realize different QoS implementations. FIGS. 7A-7C shows an example BPMN-based exception flow that provides At Least One QoS processing. From 850, method 800 proceeds to 860.

At 860, a visualization of the exception flow can be provided, for example, by operation of the application integration system. For instance, the exception flow can be represented as a BPMN sequence flow in a BPMN program (e.g., as in FIGS. 6 and 7) and displayed, for example, via a user interface of a display. In some implementations, the exceptional flow can be written in an XML file that corresponds to the visual representation of the BPMN process and can be read and compiled before executing the exception flow for handling exceptions in an integration system. After 860, method 800 stops.

In some instances, the BPMN-based integration flows (including the exception flows) enhance the usability and functionality of an integration system. The pattern-based exception handling approach helps to deal with the complex syntax and allows for more modular modeling and the change of processes.

In some implementations, tool-support can be used to reduce the complexity. With tool support, a graphical user interface can be implemented that allows presenting the potentially complex information in a more consumable way (e.g., using information layers). One important feature of modeling tool support are the "layered," read-only visualization of exception handling and compensation (potentially with special "color code") with the original integration flow model (REQ-TOOL-1: Syntax layer for exception handling). As such, the exception syntax can be available as an information layer that can be added and removed. Similarly, the compensation mechanisms can be a separate layer (REQ-TOOL-2: Syntax layer for compensation). The resolution of exception and compensation spheres can become a "first-level" syntax construct, when represented as process/subprocess (REQ-TOOL-3: Seamless embedding of layers in the integration flow syntax).

Edition of the default exception handling, thus adapting them to the specific scenario's semantics, can be done in a separate view, which reduces the complexity of the model to a view on the model but may remove information through "out-of-context" placement. On the other hand, the "in-context" editing shows the overall embedding into the integration flow, while making it hard to distinguish between integration and exception flow. The BPMN lane representation could help to separate visualization to a certain extent (REQ-TOOL-4: Analyze "in-process," "out-of-process," and "side-by-side" visualization).

The pattern-based approach could also allow for a language editor that is completely functioning on a pattern level, thus making the EIPs and the exception handling patterns "first-class" entities (REQ-TOOL-5: Analyze pattern-based modeling). That means that the user could not build an integration flow such as the ALO scenario piece-by-piece but could select from a list of quality of service patterns that fit into the existing integration flow by the tool.

In some implementations, the propagation of compensation and/or exception events to external systems can be depicted as pools. The BPMN syntax only supports message flows for inter-pool communication. As such, information regarding exceptions/compensations has to be sent with a regular message. The receiving pool therefore would need to distinguish message contents on a case by case basis. But external system modeling can be omitted when describing integration processes.

In some implementations, the explicit modeling of retry mechanisms can lead to complex diagrams. Integration systems typically support error handlers which retry a message at the point of failure. For instance, when a processor fails to process a message, the system will roll back changes made to the message in the failing processor and restart the processor. This behavior can be modeled in BPMN, for example, by attaching error events to each activity and routing the sequence flow to a gateway preceding said activity. In some instances, such a modeling may create complex diagrams with a large amount of elements. In integration systems, this behavior can be achieved by declaring it in an error handler configuration statement.

Figure 9:
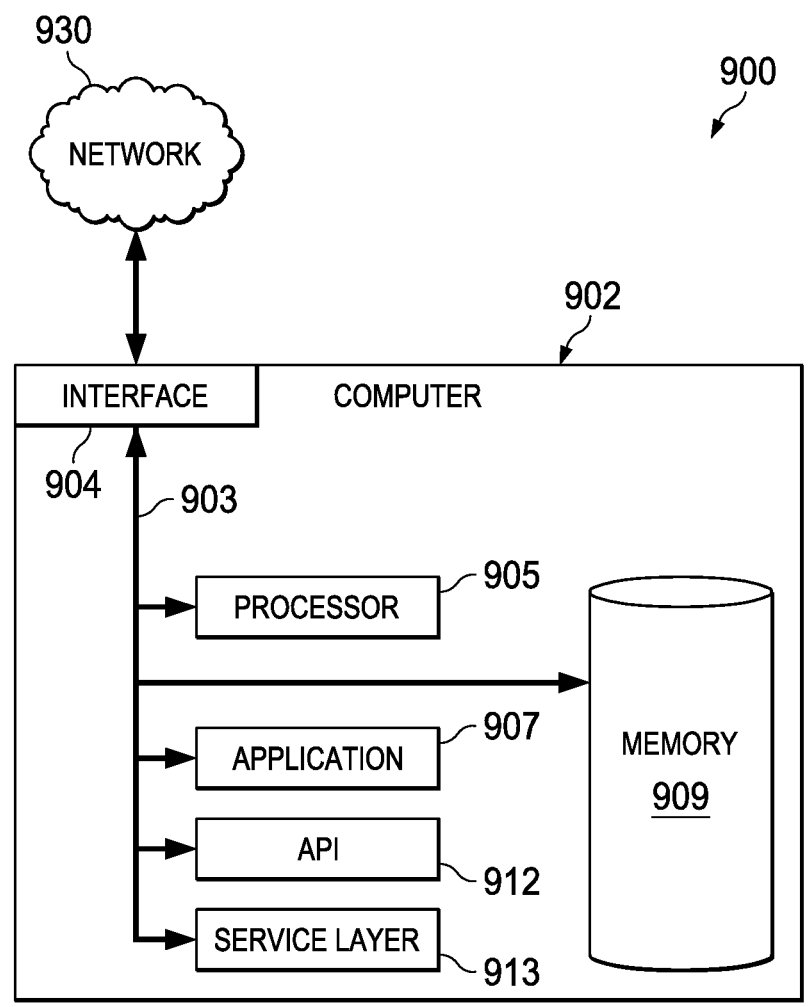
FIG. 9 is a block diagram of an exemplary computer used in the example computing system according to an implementation.

FIG. 9 is a block diagram 900 of an exemplary computer 902 used in the example computing system 100 according to an implementation. The computer 902 can include and/or make up one or more components of the computing system 100 illustrated in FIG. 1 (e.g., the first application system 105, the integration system runtime 110, the second application system 115, etc.) for handling exceptions in an integration system.

The illustrated computer 902 is intended to encompass any computing device such as a server, desktop computer, laptop/notebook computer, wireless data port, smart phone, personal data assistant (PDA), tablet computing device, one or more processors within these devices, or any other suitable processing device, including both physical and/or virtual instances of the computing device. Additionally, the computer 902 may comprise a computer that includes an input device, such as a keypad, keyboard, touch screen, or other device that can accept user information, and an output device that conveys information associated with the operation of the computer 902, including digital data, visual and/or audio information, or a GUI.

The computer 902 can serve as a client (e.g., an application system 105 or 115) and/or a server (e.g., an integration system 110), for example, for executing integration operations in a centralized, distributed, cloud-based, or another type of computing environment. The computer 902 can also serve as a computer for a database or other persistency (e.g., the data store 118, the integration flow registry 120), a compiler (e.g., the flow compiler 130), and/or any other component of the computing system 100. The illustrated computer 902 is communicably coupled with a network 930. In some implementations, one or more components of the computer 902 may be configured to operate within a cloud-computing-based environment.

At a high level, the computer 902 is an electronic computing device operable to receive, transmit, process, store, or manage data and information associated with the computing system 100. According to some implementations, the computer 902 may also include or be communicably coupled with an application server, e-mail server, web server, caching server, streaming data server, business intelligence (BI) server, and/or other server.

The computer 902 can receive requests over network 930 from a client application (e.g., a business application executing on another computer 902) and responding to the received requests by processing the said requests in an appropriate software application. In addition, requests may also be sent to the computer 902 from internal users (e.g., from a command console or by other appropriate access method), external or third-parties, other automated applications, as well as any other appropriate entities, individuals, systems, or computers.

Each of the components of the computer 902 can communicate using a system bus 903. In some implementations, any and/or all the components of the computer 902, both hardware and/or software, may interface with each other and/or the interface 904 over the system bus 903 using an application programming interface (API) 912 and/or a service layer 913. The API 912 may include specifications for routines, data structures, and object classes. The API 912 may be either computer-language independent or dependent and refer to a complete interface, a single function, or even a set of APIs. The service layer 913 provides software services to the computer 902 and/or the computing system 100. The functionality of the computer 902 may be accessible for all service consumers using this service layer. Software services, such as those provided by the service layer 913, provide reusable, defined business functionalities through a defined interface. For example, the interface may be software written in JAVA, C++, or other suitable language providing data in extensible markup language (XML) format or other suitable format. While illustrated as an integrated component of the computer 902, alternative implementations may illustrate the API 912 and/or the service layer 913 as stand-alone components in relation to other components of the computer 902 and/or computing system 100. Moreover, any or all parts of the API 912 and/or the service layer 913 may be implemented as child or sub-modules of another software module, enterprise application, or hardware module without departing from the scope of this disclosure.

The computer 902 includes an interface 904. Although illustrated as a single interface 904 in FIG. 9, two or more interfaces 904 may be used according to particular needs, desires, or particular implementations of the computer 902 and/or computing system 100. The interface 904 is used by the computer 902 for communicating with other systems in a distributed environment—including within the computing system 100—connected to the network 930 (whether illustrated or not). Generally, the interface 904 includes logic encoded in software and/or hardware in a suitable combination and operable to communicate with the network 930. More specifically, the interface 904 may include software supporting one or more communication protocols associated with communications such that the network 930 or interface's hardware is operable to communicate physical signals within and outside of the illustrated computing system 100.

The computer 902 includes a processor 905. Although illustrated as a single processor 905 in FIG. 9, two or more processors may be used according to particular needs, desires, or particular implementations of the computer 902 and/or the computing system 100. Generally, the processor 905 executes instructions and manipulates data to perform the operations of the computer 902. Specifically, the processor 905 executes the functionality required to run one or more business applications, provide integration operations, and handle exceptions in an integration system.

The computer 902 also includes a memory 909 that holds data for the computer 902 and/or other components of the computing system 100. Although illustrated as a single memory 909 in FIG. 9, two or more memories may be used according to particular needs, desires, or particular implementations of the computer 902 and/or the computing system 100. While memory 909 is illustrated as an integral component of the computer 902, in alternative implementations, memory 909 can be external to the computer 902 and/or the computing system 100.

The application 907 is an algorithmic software engine providing functionality according to particular needs, desires, or particular implementations of the computer 902 and/or the computing system 100, particularly with respect to functionality required to model exception flows in an integration system (e.g., including executing one or more business applications, performing integration operations, and handling exceptions, or other types of business integration services). For example, application 907 can serve as a sending or receiving application of a business integration system (e.g., the first application system 105 or receiving application system 115), the integration system runtime 110, the integration flow repository 120, the (exception) flow compiler 130, and/or other application associated with the computer 902 and/or the computing system 100. Further, although illustrated as a single application 907, the application 907 may be implemented as multiple applications 907 on the computer 902. In addition, although illustrated as integral to the computer 902, in alternative implementations, the application 907 can be external to the computer 902 and/or the computing system 100.

There may be any number of computers 902 associated with, or external to, the computing system 100 and communicating over network 930. Further, the term "client," "user," and other appropriate terminology may be used interchangeably as appropriate without departing from the scope of this disclosure. Moreover, this disclosure contemplates that many users may use one computer 902, or that one user may use multiple computers 902.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by data processing apparatus. The computer-storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including, by way of example, a programmable processor, a computer, or multiple processors or computers. The apparatus can also be or further include special purpose logic circuitry, e.g., a central processing unit (CPU), an FPGA (field programmable gate array), or an application-specific integrated circuit (ASIC). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example LINUX, UNIX, WINDOWS, MAC OS, ANDROID, IOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a CPU, a FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM) or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a global positioning system (GPS) receiver, or a portable storage device, e.g., a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto-optical disks; and CD-ROM, DVD+/−R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer with a display device, e.g., a CRT (cathode ray tube), LCD (liquid crystal display), LED (light emitting diode), or plasma monitor, for displaying information to the user and a keyboard and a pointing device, e.g., a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of wireline and/or wireless digital data communication, e.g., a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n and/or 802.20, all or a portion of the Internet, and/or any other communication system or systems at one or more locations. The network may communicate with, for example, Internet Protocol (IP) packets, Frame Relay frames, Asynchronous Transfer Mode (ATM) cells, voice, video, data, and/or other suitable information between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware and/or software, may interface with each other and/or the interface using an application programming interface (API) and/or a service layer. The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers via this service layer. Software services provide reusable, defined business functionalities through a defined interface. For example, the interface may be software written in JAVA, C++, or other suitable language providing data in extensible markup language (XML) format or other suitable format. The API and/or service layer may be an integral and/or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation and/or integration of various system modules and components in the implementations described above should not be understood as requiring such separation and/or integration in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims, as will be apparent to those skilled in the art. For example, the actions recited in the claims can be performed in a different order and still achieve desirable results.

Accordingly, the above description of example implementations does not define or constrain this disclosure. Other changes, substitutions, and alterations are also possible without departing from the spirit and scope of this disclosure.

What is claimed is:

1. A computer-implemented method, comprising:
   identifying an exception corresponding to an integration operation of an integration process for messaging processing between a sending and a receiving computing system;
   determining a type of the identified exception;
   determining that the exception type indicates that the integration operation contains one or more activities belonging to a compensation sphere associated with a compensation sphere exception handling pattern requiring one or more correcting compensation activities logically linked through compensation characteristics, wherein multiple compensation spheres can be configured to overlap and to be stacked hierarchically; and configuring an exception flow of the integration process based on the one or more correcting compensation activities.

2. The computer-implemented method of claim 1, comprising classifying exceptions into a plurality of types.

3. The computer-implemented method of claim 1, comprising providing a visualization of the exception flow.

4. The computer-implemented method of claim 1, wherein the compensation sphere exception handling pattern is syntactically mapped to Business Process Model and Notation (BPMN) and its execution semantics.

5. The computer-implemented method of claim 1, wherein the type of the exception comprises one or more of an activity failure, a message flow failure, a timeout, resource unavailability, an external event, or a constraint violation.

6. The computer-implemented method of claim 1, wherein the exception flow is configured to realize one or more of a quality of service (QoS), a message exchange pattern (MEP), or an enterprise integration pattern (EIP) integration logic.

7. A non-transitory, computer-readable medium storing computer-readable instructions executable by a computer and configured to:

identify an exception corresponding to an integration operation of an integration process for messaging processing between a sending and a receiving computing system;

determine a type of the identified exception;

determine that the exception type indicates that the integration operation contains one or more activities belonging to a compensation sphere associated with a compensation sphere exception handling pattern requiring one or more correcting compensation activities logically linked through compensation characteristics, wherein multiple compensation spheres can be configured to overlap and to be stacked hierarchically; and configure an exception flow of the integration process based on the one or more correcting compensation activities.

8. The non-transitory, computer-readable medium of claim 7, comprising instructions to classify exceptions into a plurality of types.

9. The non-transitory, computer-readable medium of claim 7, comprising instructions to provide a visualization of the exception flow.

10. The non-transitory, computer-readable medium of claim 7, wherein the compensation sphere exception handling pattern is syntactically mapped to Business Process Model and Notation (BPMN) and its execution semantics.

11. The non-transitory, computer-readable medium of claim 7, wherein the type of the exception comprises one or more of an activity failure, a message flow failure, a timeout, resource unavailability, an external event, or a constraint violation.

12. The non-transitory, computer-readable medium of claim 7, wherein the exception flow is configured to realize one or more of a quality of service (QoS), a message exchange pattern (MEP), or an enterprise integration pattern (EIP) integration logic.

13. A computer-implemented system, comprising:

a memory;

at least one hardware processor interoperably coupled with the memory and configured to:

identify an exception corresponding to an integration operation of an integration process for messaging processing between a sending and a receiving computing system;

determine a type of the identified exception;

determine that the exception type indicates that the integration operation contains one or more activities belonging to a compensation sphere associated with a compensation sphere exception handling pattern requiring one or more correcting compensation activities logically linked through compensation characteristics, wherein multiple compensation spheres can be configured to overlap and to be stacked hierarchically; and configure an exception flow of the integration process based on the one or more correcting compensation activities.

14. The computer-implemented system of claim 13, wherein the at least one hardware processor configured to provide a visualization of the exception flow.

15. The computer-implemented system of claim 13, wherein the compensation sphere exception handling pattern is syntactically mapped to Business Process Model and Notation (BPMN) and its execution semantics.

16. The computer-implemented system of claim 13, wherein the type of the exception comprises one or more of an activity failure, a message flow failure, a timeout, resource unavailability, an external event, or a constraint violation.

17. The computer-implemented system of claim 13, wherein the exception flow is configured to realize one or more of a quality of service (QoS), a message exchange pattern (MEP), or an enterprise integration pattern (EIP) integration logic.

* * * * *